United States Patent
Marburger et al.

(10) Patent No.: US 11,878,383 B2
(45) Date of Patent: Jan. 23, 2024

(54) POSITIONABLE BLOCK ASSEMBLIES

(71) Applicants: Jason A. Marburger, Spokane, WA (US); Elliott Ian Wong, Alhambra, CA (US)

(72) Inventors: Jason A. Marburger, Spokane, WA (US); Elliott Ian Wong, Alhambra, CA (US)

(73) Assignee: FIREBALL TOOL WORKS LLC, Sante Fe Springs, CA (US)

( * ) Notice: Subject to any disclaimer, the term of this patent is extended or adjusted under 35 U.S.C. 154(b) by 225 days.

(21) Appl. No.: 17/400,939

(22) Filed: Aug. 12, 2021

(65) Prior Publication Data
US 2023/0047132 A1 Feb. 16, 2023

(51) Int. Cl.
*B23Q 3/10* (2006.01)

(52) U.S. Cl.
CPC ..................................... *B23Q 3/10* (2013.01)

(58) Field of Classification Search
CPC ............. B25H 1/08; B25H 1/10; B23Q 3/102
See application file for complete search history.

(56) References Cited

U.S. PATENT DOCUMENTS

| 4,805,889 | A | * | 2/1989 | Liepse | ................... | B23Q 13/00 |
| | | | | | | 269/902 |
| 5,324,013 | A | | 6/1994 | Marino | | |
| 5,595,378 | A | * | 1/1997 | Martinsson | ........... | F16B 7/0493 |
| | | | | | | 269/45 |
| 2020/0156218 | A1 | | 5/2020 | Chang | | |

FOREIGN PATENT DOCUMENTS

| FR | 1334524 | 8/1963 | | |
| GB | 591087 | 8/1947 | | |
| GB | 1217741 | 12/1970 | | |
| WO | WO-2014072092 | | 5/2014 | |
| WO | WO-2014072092 A1 * | 5/2014 | ............... B25B 1/08 |

OTHER PUBLICATIONS

"International Search Report and Written Opinion", Application No. PCT/US21/47887, dated Dec. 7, 2021, 9 pages.

* cited by examiner

*Primary Examiner* — Tyrone V Hall, Jr.
(74) *Attorney, Agent, or Firm* — FIG. 1 Patents

(57) ABSTRACT

Positionable block assemblies are described. Example block assemblies include a block body with a tooth surface and a plate member with a tooth surface. The tooth surfaces of the plate member and the block body are engageable to interlock the plate member with the block body. Further, the block body is engageable with the plate member at multiple different positions to enable precise positioning of a positionable block assembly to achieve a variety of different working scenarios.

20 Claims, 33 Drawing Sheets

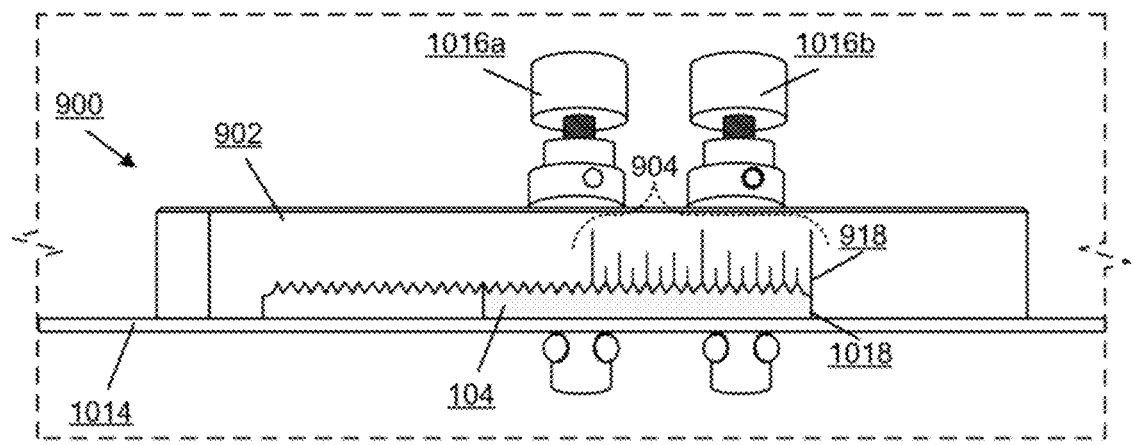
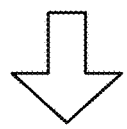
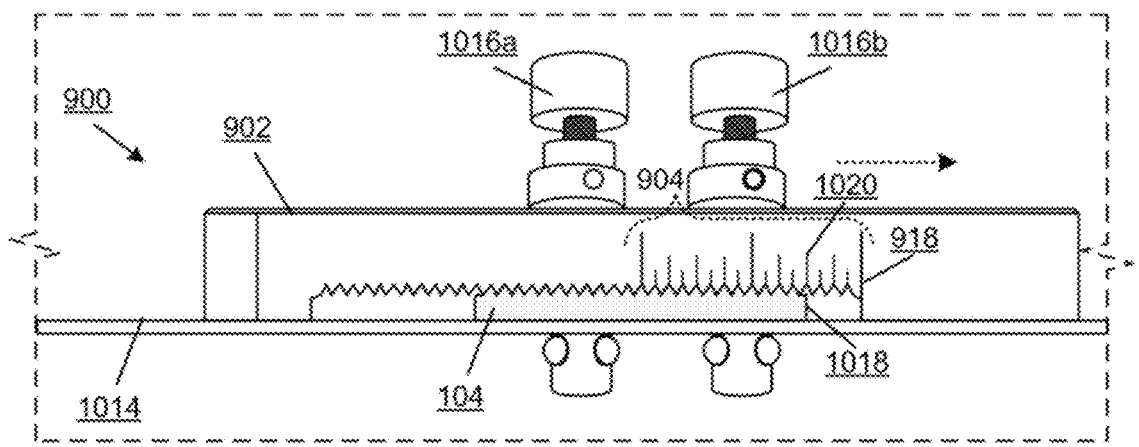
Fig. 10b

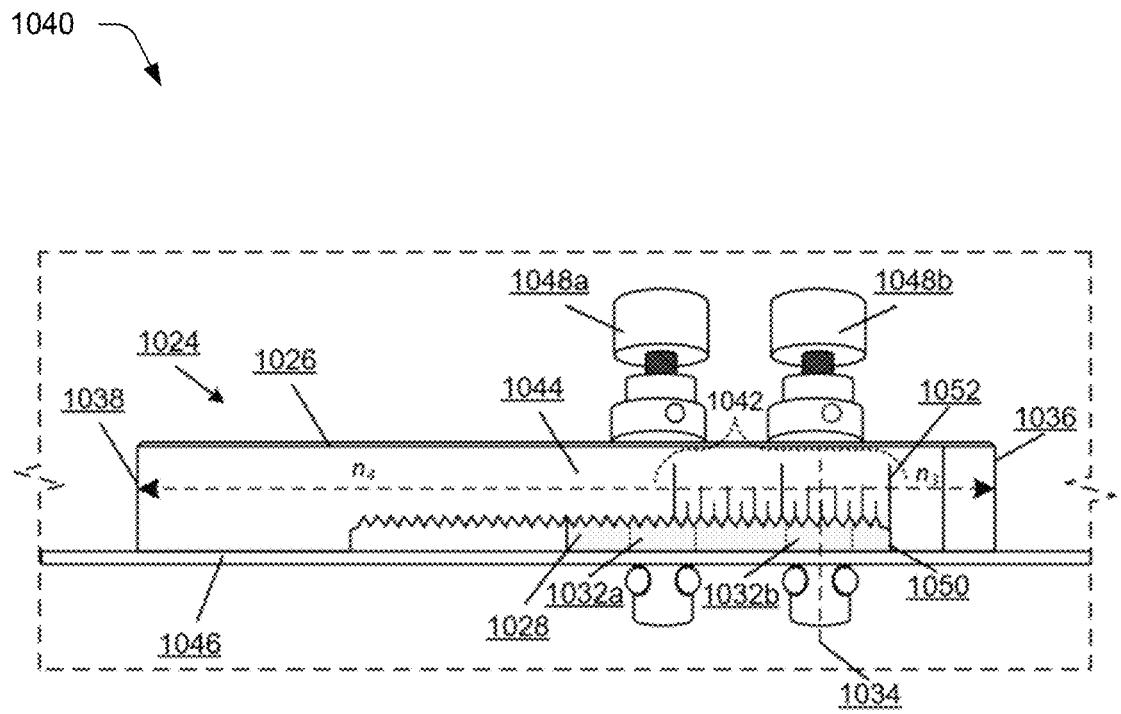
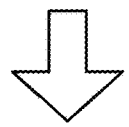
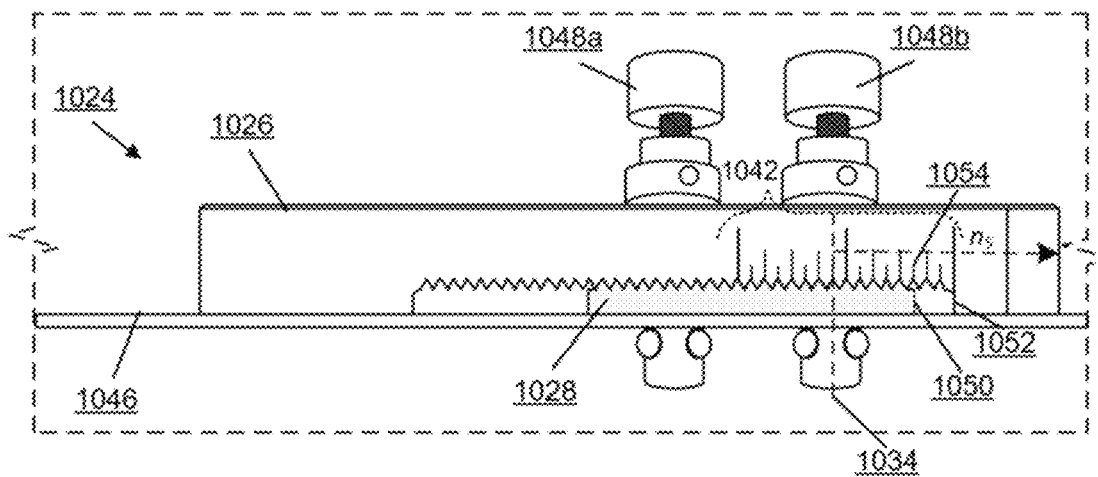
Fig. 10d

POSITIONABLE BLOCK ASSEMBLIES

BACKGROUND

Welders, carpenters, and personnel in general often have a need to arrange workpieces at various positions to apply work to the workpieces, such as for designing, joining, finishing, etc. A welder, for instance, frequently needs to weld metal workpieces together at specific positions and angles. To assist personnel in arranging and holding workpieces in position, gridded tables have been developed that include grids of holes that are arranged to receive and hold various tools, such as pins, clamps, stop blocks, etc. Stop blocks, for instance, can be arranged on a grid table via pins that attempt to secure the stop blocks in various positions. Conventional pin and stop block implementations, however, do not provide for secure attachment to a grid table and are prone to unwanted movement during use. Further, precise placement of a stop block on a grid is difficult due to imprecision involved in a convention pin and stop block assembly. Thus, conventional tools lack the ability to quickly and accurately align workpieces in various scenarios and to ensure that workpiece alignment does not change while work is being applied to a workpiece.

SUMMARY

Positionable block assemblies are described. Example block assemblies include a block body with a tooth surface and a plate member with a tooth surface. The tooth surfaces of the plate member and the block body are engageable to interlock the plate member with the block body. Further, the block body is engageable with the plate member at multiple different positions to enable precise positioning of a positionable block assembly to achieve a variety of different working scenarios.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 10b depicts a scenario for repositioning of a block assembly based on the scale region in accordance with one or more implementations.

FIG. 10d depicts a scenario illustrating aspects for implementing a distance offset utilizing a plate assembly in accordance with one or more implementations.

DETAILED DESCRIPTION

Overview

Figure 1:
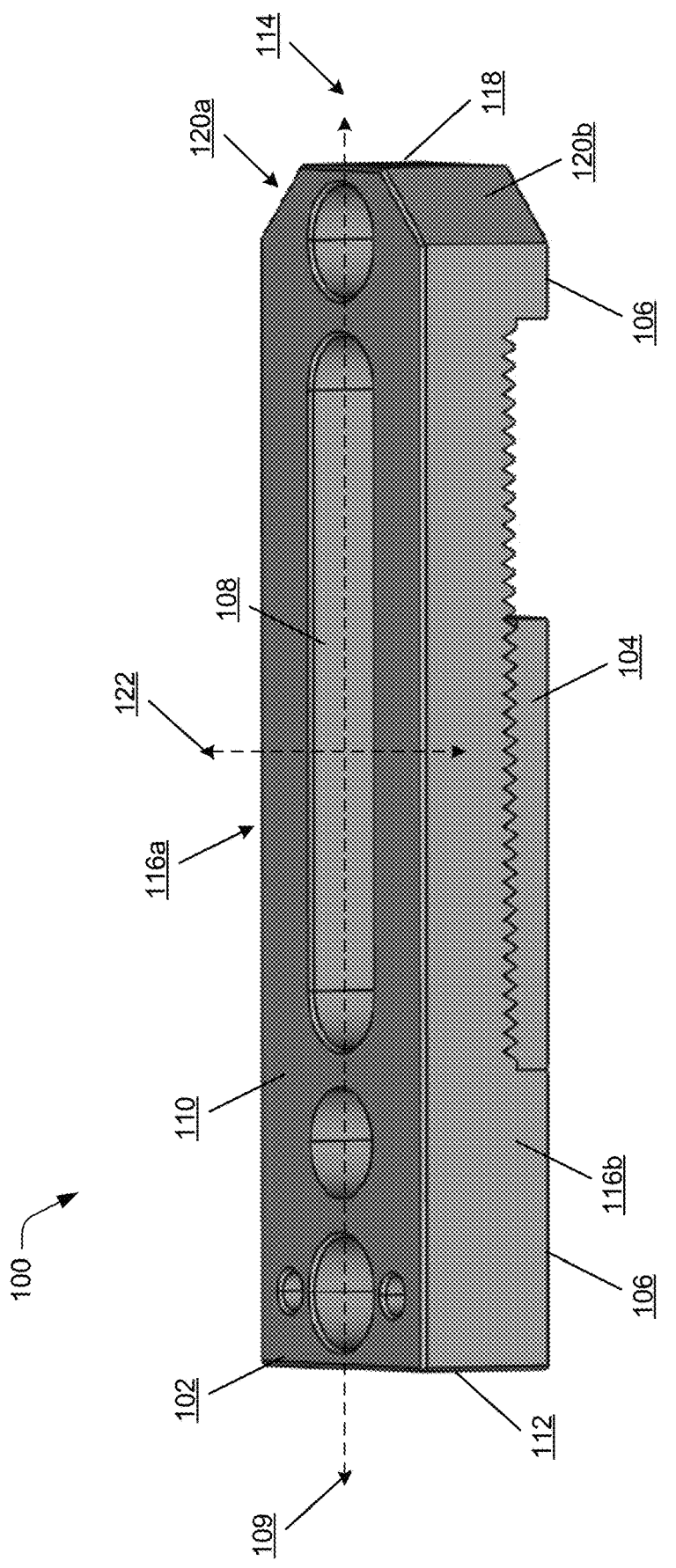
FIG. 1 depicts a side view of an example block assembly in accordance with one or more implementations.

Positionable block assemblies are described. In an example implementation a block assembly includes a block body and a plate member that is engageable with the block body. The block body, for instance, includes a first tooth surface and the plate member includes a second tooth surface that is engageable with the first tooth surface of the block body to generate a block assembly. Further, the block body and the plate member include apertures through which pins and/or other fasteners can be placed to attach the block assembly to an adjacent surface, such as a gridded surface of a work table.

In an example implementation a block body of a block assembly includes an extended pin slot and a plate member includes circular apertures that align with the pin slot. To attach the block assembly to a grid surface, the tooth surfaces of the plate member and the block body are engaged and pins are positioned through the pin slot of the block body, the apertures of the plate member, and apertures within the grid surface. With the pins engaged through the block assembly and with the grid surface, the block body can be repositioned on the grid surface by disengaging the tooth surface of the block body from the tooth surface of the plate member and moving the block body relative to the plate member. The pin slot in the block body, for instance, allows movement of the block body while the pins remain engaged through the block body. Further, engagement of the pins through the apertures in the plate member prevents movement of the plate member during movement of the block body. Generally, this enables precise positioning and repositioning of the block body.

In at least one implementation of a block assembly the tooth patterns of the block body and the plate member are formed at specific increments of a linear measurement scale, such as units of the Imperial measurement system and/or metric system. Accordingly, precise positioning of the block body relative to the plate member can be achieved via movement of the block body relative to the plate member by engaging the tooth surface of the block body with the tooth surface of the plate member at different positions. Further, at least some implementations utilize differing tooth patterns in a block body and a plate member to provide for different incremental engagement of a block body with a plate member.

In at least one implementation of a block assembly the tooth surfaces of the block body and the plate member are formed as surface features, such as via machining and/or casting of the respective parts of the block assembly. Alternatively or additionally modular tooth fittings can be utilized that are attachable to a block body and/or a plate member to enable toothed engagement of a plate member with a block body as part of a block assembly. For instance, a block body and/or a plate member include a fitting cavity into which a tooth fitting can be removably attached. Alternatively or additionally, a tooth fitting can be attached to a side surface of a block body and/or a plate member to provide the block body and/or plate member with a tooth surface for toothed engagement.

Accordingly, the described block assemblies provide for a multitude of different block configurations and workpiece arrangements not provided by conventional tools for aligning workpieces.

In the following discussion, example positionable block assemblies are described that may employ the techniques described herein. Example scenarios are then described in which the example positionable block assemblies are utilized to align example workpieces. The example positionable block assemblies are not limited to performance of the example scenarios.

Positionable Block Assemblies

FIGS. 1-23 depict various attributes of example block assemblies that are operable to employ techniques described herein. FIG. 1 depicts a side view of an example block assembly 100 in accordance with one or more implementations described herein. The block assembly 100 includes a block body 102 and a plate member 104 engaged with a bottom surface 106 of the block body 102. The block body 102 forms a closed pin slot 108 that is formed longitudinally along a longitudinal axis 109 of the block body 102 and through a top surface 110 of the block body 102. In at least one implementation the pin slot 108 forms an extended and elongated oval slot extending longitudinally along block body 102. As further described below, pins can be placed through the pin slot 108 to secure the block assembly 100 to an adjacent surface, such as a gridded work surface. The block body 102 includes various surfaces that can be used for workpiece and/or tool arrangement including a rear surface 112, a front surface 114, a side surface 116a, and a side surface 116b.

In this particular example the front surface 114 includes multiple surfaces includes a face surface 118, an angled surface 120a, and an angled surface 120b. The face surface 118, for instance, is coplanar with a plane that runs codirectionally with a lateral axis 122 of the block body 102. The angled surfaces 120a, 120b are angled relative to the face surface 118 and the side surfaces 116a, 116b. In at least one implementation, the angled surface 120a intersects the side surface 116a and the face surface 118 at an acute angle (e.g., 45 degrees) and the angled surface 120b intersects the side surface 116b and the face surface 118 at an acute angle, e.g., 45 degrees. As further detailed below, the differently angled surfaces of the front surface 114 enable workpieces to be arranged at different angles relative to one another.

Figure 2A:
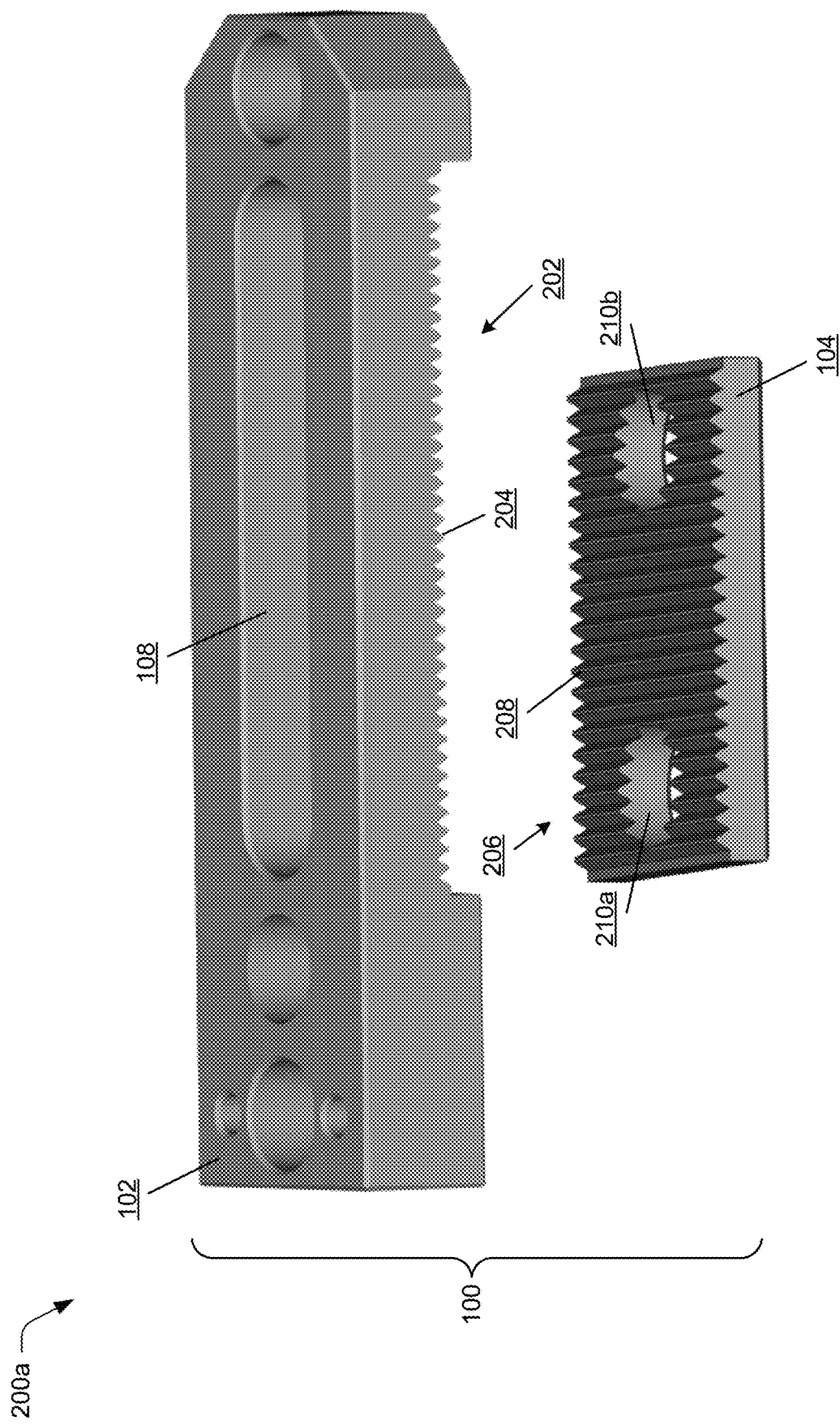
FIG. 2a depicts a view of a block assembly with a plate member disengaged from a block body in accordance with one or more implementations.

FIG. 2a depicts a view 200a of the block assembly 100 with the plate member 104 disengaged from the block body 102. The view 200a illustrates an interior surface 202 of the block body 102 including a side view of a body tooth surface 204, and a top surface 206 of the plate member 104 including a plate tooth surface 208. The interior surface 202 forms an interior cavity of the of the block body 102 in which the plate member 104 is engageable. Further, the pin slot 108 extends through an interior of the block body 102 from the top surface 206 to the interior surface 202. The body tooth surface 204 forms teeth according to a particular tooth pattern, and the plate tooth surface 208 forms teeth according to a particular tooth pattern. As described below, the body tooth surface 204 and the plate tooth surface 208 engage (e.g., mesh) with one another to cooperatively form the block assembly 100. Generally, the plate member 104 is dimensioned to fit within the interior surface 202 to enable the plate tooth surface 208 and the body tooth surface 204 to engage. The view 200a also illustrates that the plate member 104 forms a pin aperture 210a and a pin aperture 210b that are formed to enable pins and/or other attachment mechanisms to protrude through the plate member 104. For instance, pins can be placed through the pin slot 108 and penetrate the pin apertures 210a, 210b to enable attachment of the block assembly to an adjacent surface.

Figure 2B:
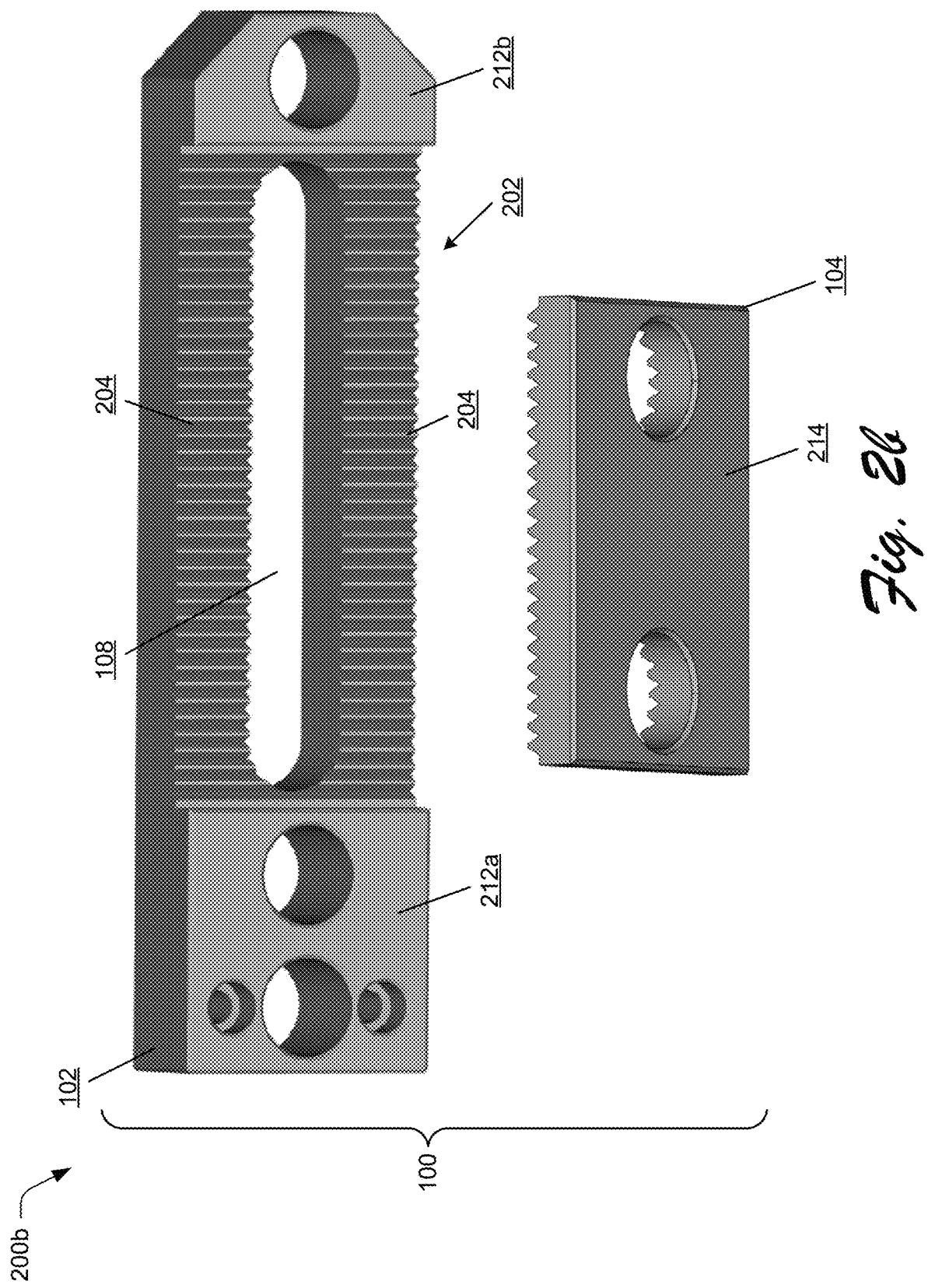
FIG. 2b depicts a view of a block assembly with a plate member disengaged from a block body in accordance with one or more implementations.

FIG. 2b depicts a view 200b of the block assembly 100 with the plate member disengaged from the block body 102. The view 200b illustrates the interior surface 202 of the block body 102 with the body tooth surface 204. In this particular example the pin slot 108 is formed within the body tooth surface 204. The view 200b also illustrates bottom surfaces 212a, 212b of the block body 102 and a bottom surface 214 of the plate member 104. With the plate member 104 engaged with the block body 102, the bottom surfaces 212a, 212b, 214 form a bottom surface of the block assembly 100. For instance, with the plate member 104 engaged within the interior surface 202, the bottom surface 214 of the plate member 104 is substantially coplanar with the bottom surfaces 212a, 212b.

Figure 3:
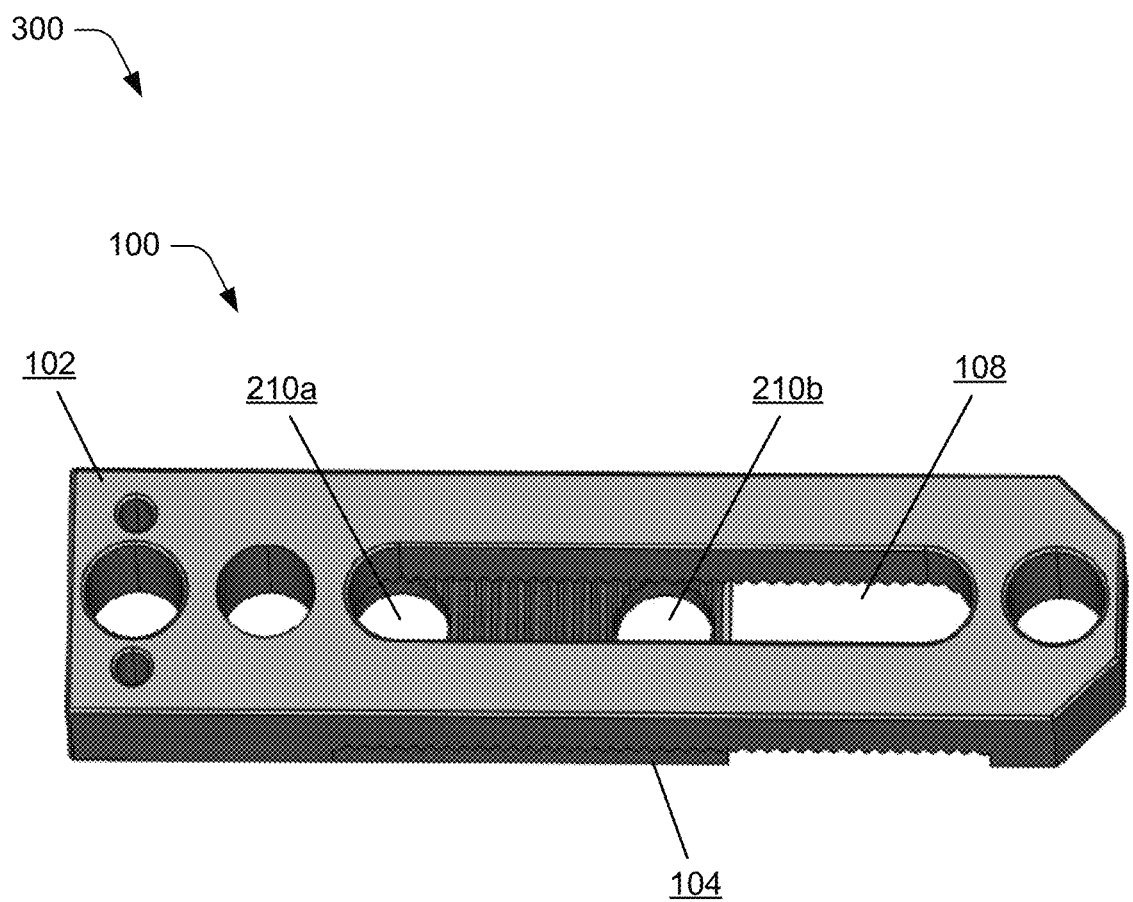
FIG. 3 depicts a top view of a block assembly with a plate member engaged with a block body in accordance with one or more implementations.

FIG. 3 depicts a top view 300 of the block assembly 100 with the plate member 104 engaged with the block body 102. In the view 300 the pin apertures 210a, 210b are visible through the pin slot 108. As illustrated, with the plate member 104 engaged with the block body 102, the pin apertures 210 align with the pin slot 108.

Figure 4:
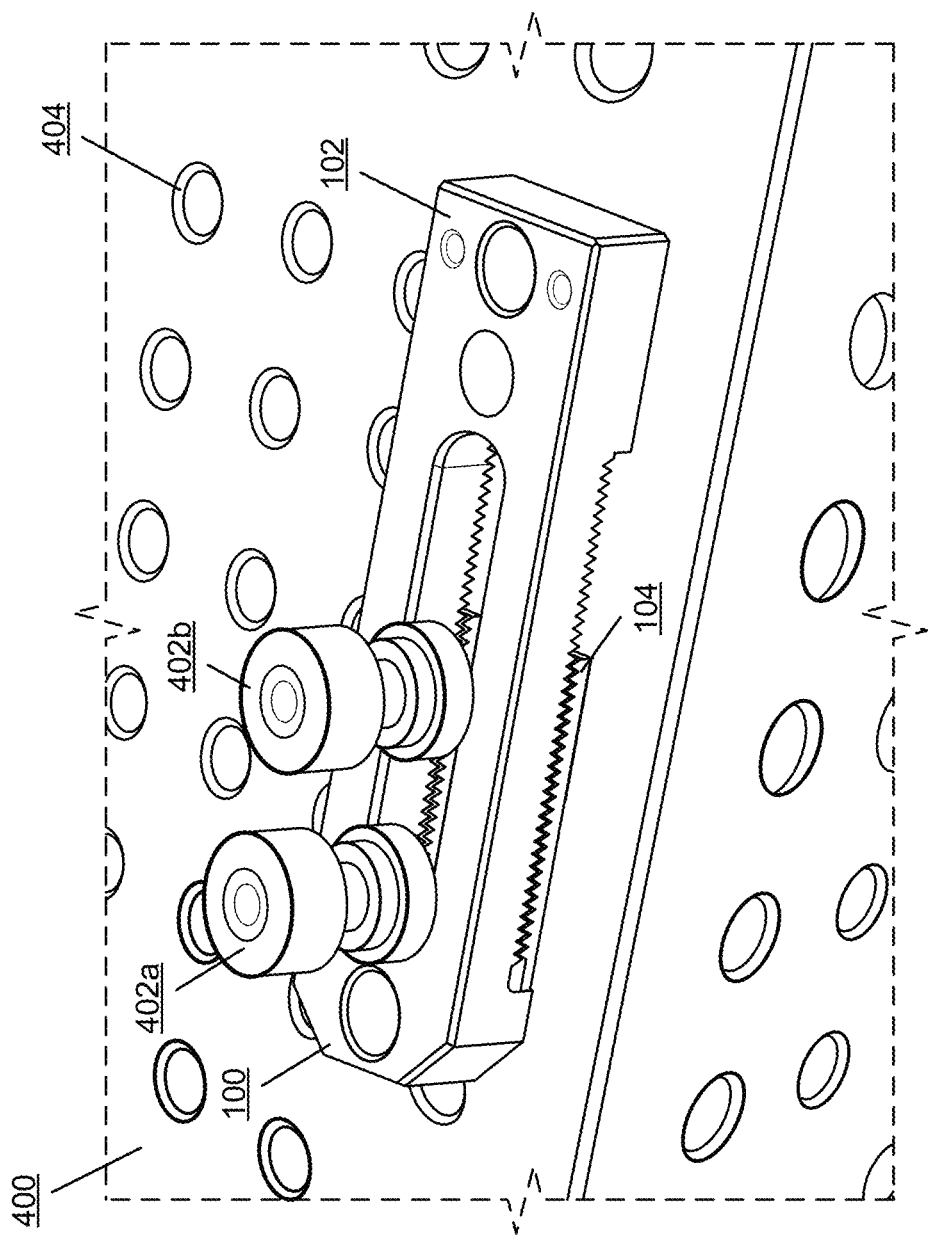
FIG. 4 depicts a block assembly attached to a grid surface in accordance with one or more implementations.

FIG. 4 depicts the block assembly 100 attached to a grid surface 400 via a pin 402a and a pin 402b. The grid surface 400, for instance, is part of a table and/or other work surface and includes grid apertures 404 into which various apparatus can be placed, such as the pins 402a, 402b. Generally, the pins 402a, 402b are placed through the pin slot 108, penetrate the pin apertures 210a, 210b (not illustrated here) and penetrate a set of grid apertures 404 to fasten the block assembly 100 to the grid surface 400. With the plate member 104 engaged with the block body 102 and the pins 402a, 402b fastening the block assembly 100 to the grid surface 400, the block assembly 100 is securely fastened to the grid surface 400 and resists movement such as during placement and manipulation of a workpiece against the block assembly 100.

Figure 5:
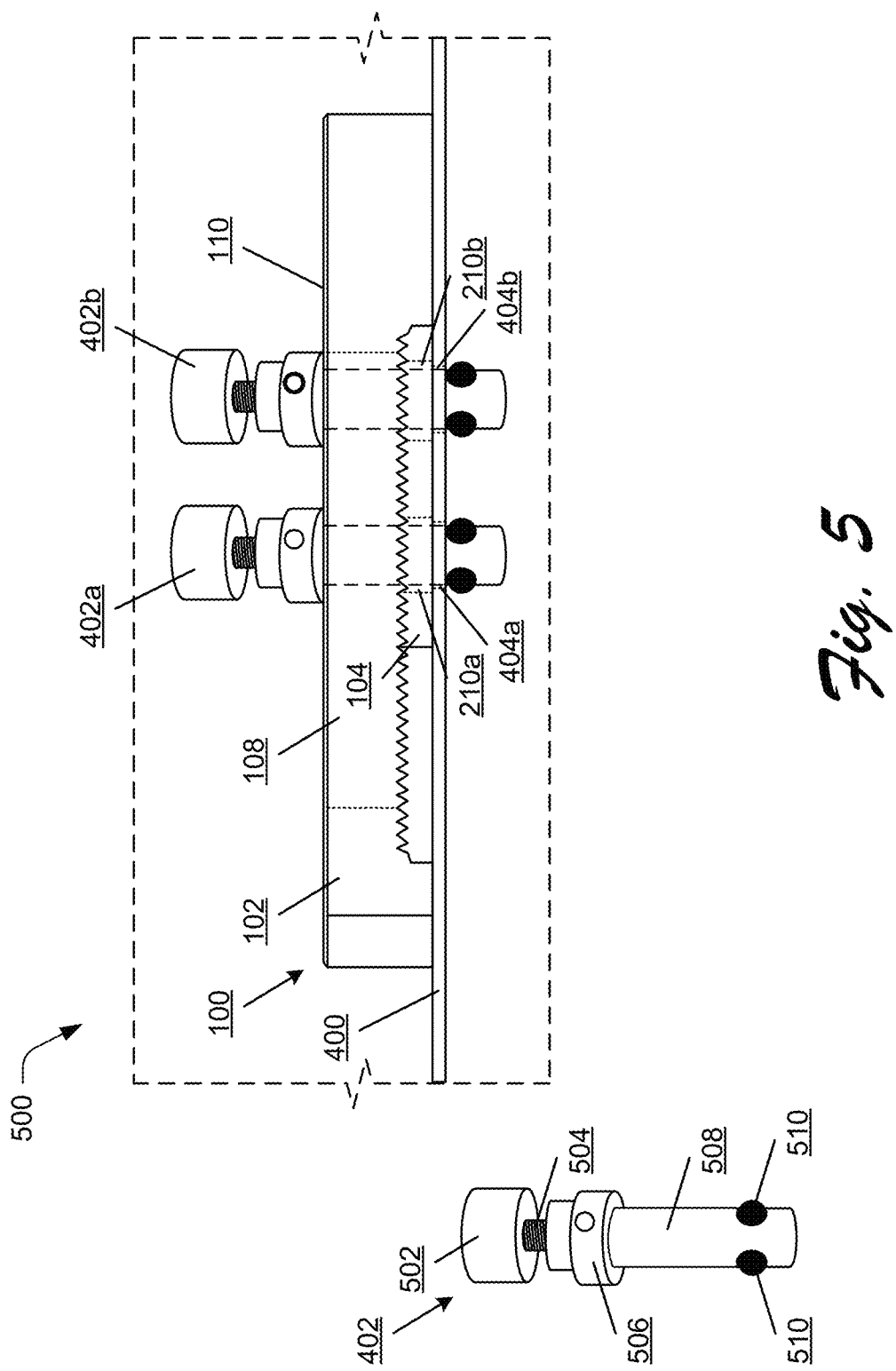
FIG. 5 depicts a side view with a partial transparent view of a block assembly attached to a grid surface in accordance with one or more implementations.

FIG. 5 depicts a side view 500 with a partial transparent view of the block assembly attached to the grid surface 400, such as described with reference to FIG. 4. The side view 500 shows the pins 402a, 402b penetrating the pin slot 108 of the block body 102, the pin apertures 210a, 210b of the plate member 104, and grid apertures 404a, 404b of the grid surface 400.

A pin 402 is also depicted that represents an implementation of the pins 402a, 402b and for purpose of explaining operation of the pins 402a, 402b for fastening the block assembly 100 to an adjacent surface, e.g., the grid surface 400. The pin 402 includes a pin head 502 attached to a threaded pin rod 504, a pin collar 506, a pin shaft 508, and pin bearings 510. To enable the pin 402 to be used to fasten the block assembly 100 to the grid surface 400, the pin head 502 is loosened (e.g., rotated counterclockwise) to cause the pin rod 504 to move upwardly within the pin shaft 508. This movement of the pin rod 504 releases tension on the pin bearings 510 and enables the pin bearings 510 to move inwardly into the pin shaft 508.

Accordingly, the pin 402 is placed through the pin slot 108, a pin aperture 210, and a grid aperture 404. The pin head 502 is then tightened (e.g., rotated clockwise) to cause the pin rod 504 to move downwardly within the pin shaft 508 and to apply pressure to the pin bearings 510 to force the pin bearings 510 outwardly from the pin shaft 508. The pin bearings 510 are captured within the pin shaft 508 such that they do not escape from the pin shaft 508 but are held in an outwardly protruding state relative to the pin shaft 508 by pressure from the pin rod 504. Generally, a containment circumference created by the pin bearings 510 is larger than a circumference of a grid aperture 404 and thus when the pin 402 is tightened the pin bearings 510 prevent the pin 402 from moving upwardly through the grid aperture 404. Further, the pin collar 506 engages with the top surface 110 of the block body 102 and tightening of the pin 402 causes the pin collar 506 to apply pressure against the top surface 110.

Accordingly, engagement of the pin bearings 510 with the grid surface 400 and the pin collar 506 with the top surface 110 of the block body 102 secures the block assembly 100 to the grid surface 400. This particular example of attachment of the block assembly 100 to an adjacent surface is presented for purpose of example only, and a wide variety of different attachment techniques can be utilized in accordance with the described implementations, such as using a threaded fastener (e.g., a threaded bolt) and a threaded grid aperture 404, a bolt and nut placed through the block assembly 100 and a grid aperture 404, and/or any other suitable attachment mechanism.

Figure 6:
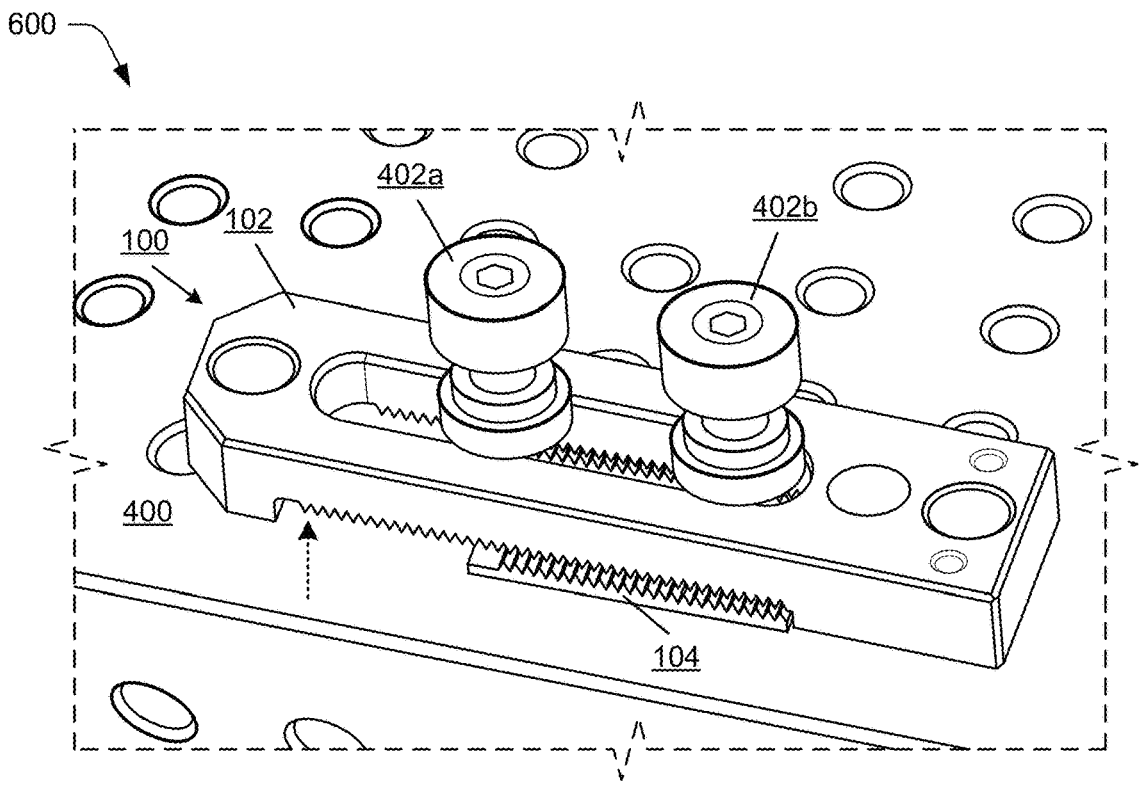
FIG. 6 depicts a scenario in which a block assembly is placed in a position to enable movement in accordance with one or more implementations.

FIG. 6 depicts a scenario 600 in which the block assembly 100 is placed in a position to enable movement. In the scenario 600, the pins 402a, 402b are loosened (e.g., as described above) which reduces pressure applied by the pins 402a, 402b holding the block assembly 100 against the grid surface 400. This enables the block body 102 to be moved away from the plate member 104 (e.g., upwardly away from the grid surface 400) and to disengage from the plate member 104.

Figure 7:
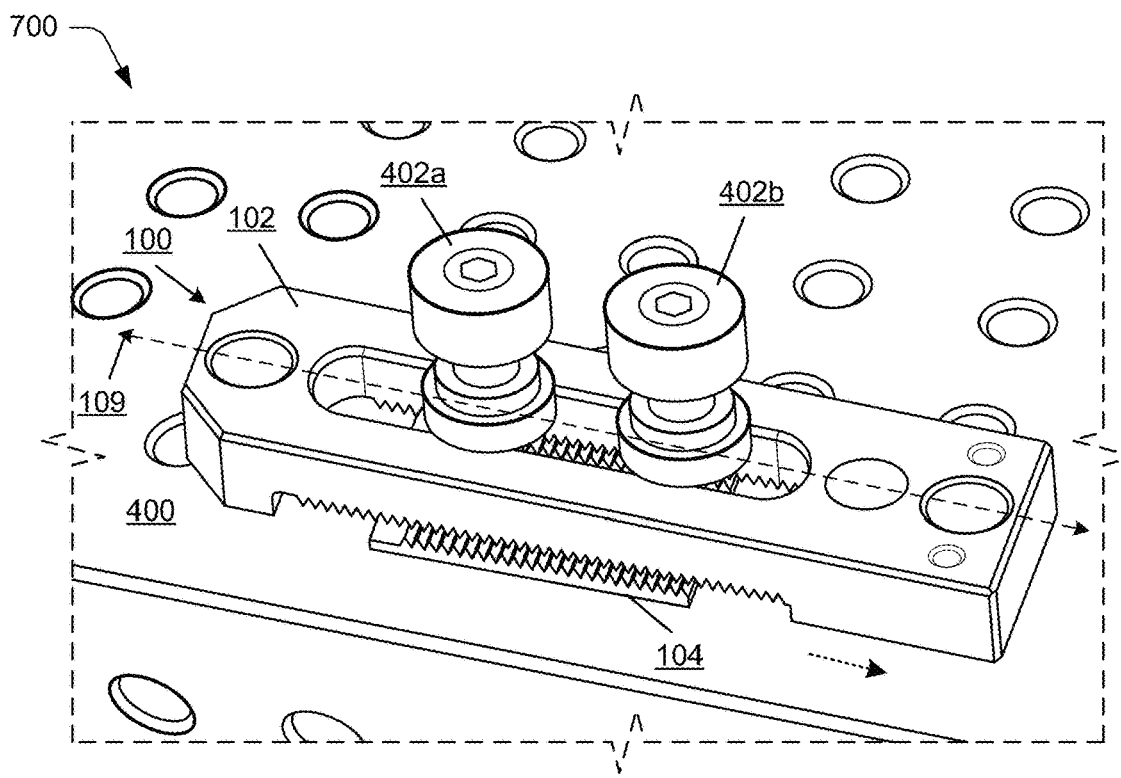
FIG. 7 depicts a scenario in which a block assembly is repositioned in accordance with one or more implementations.

FIG. 7 depicts a scenario 700 in which the block assembly 100 is repositioned. The scenario 700, for example, represents a continuation of the scenario 600. In the scenario 700, the block body 102 is disengaged from the plate member 104 and is repositioned relative to the plate member 104. For instance, with the pins 402a, 402b loosened, a user lifts the block body 102 to disengage from the plate member 104 and then repositions the block body 102 relative to the plate member 104. The user, for example, slides the block body 102 along the grid surface 400 and longitudinally relative to the longitudinal axis 109. Generally, during movement of the block body 102 the pins 402a, 402b remain engaged within respective pin apertures 210 within the plate member 104 and grid apertures 404 and thus hold the plate member 104 in position, e.g., to prevent movement of the plate member 104 during movement of the block body 102.

Figure 8:
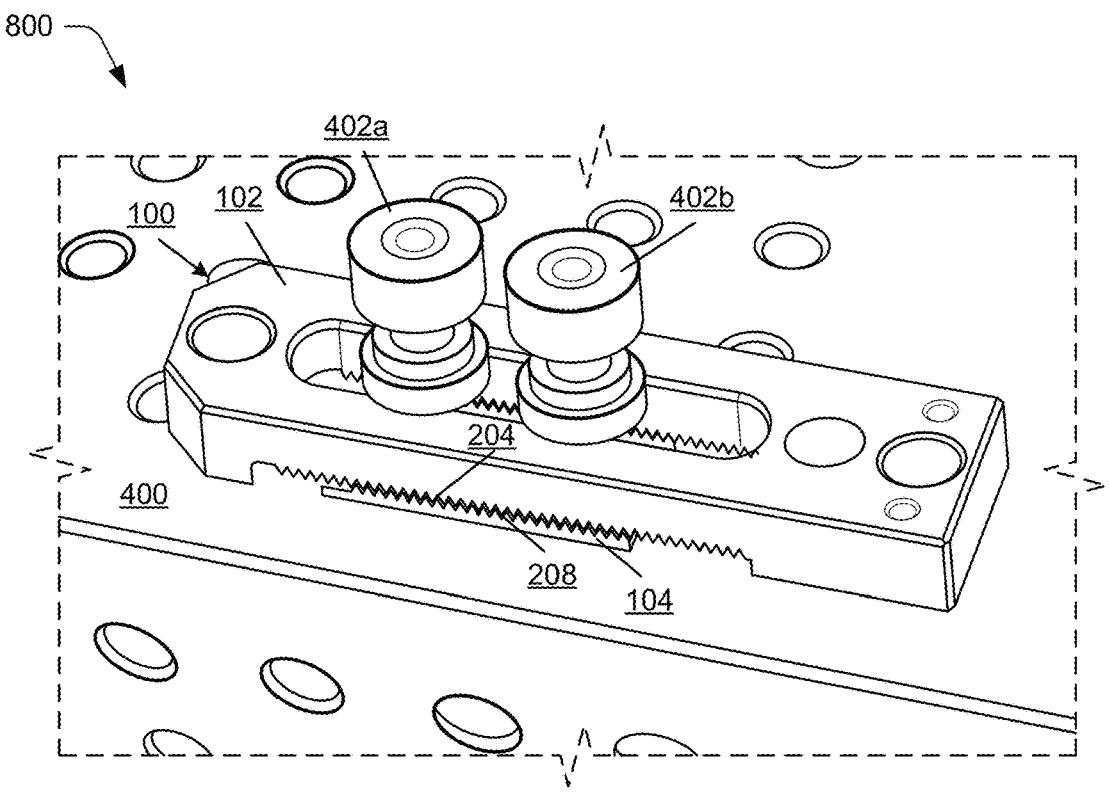
FIG. 8 depicts a scenario in which a block assembly is fastened to an adjacent surface in accordance with one or more implementations.

FIG. 8 depicts a scenario 800 in which the block assembly 100 is fastened to an adjacent surface. The scenario 800, for instance, represents a continuation of the scenario 700. In the scenario 800 the block body 102 is engaged with the plate member 104. For instance, after moving the block body 102 along the grid surface 400 (e.g., as described in the scenario 700), a user releases the block body 102 such that the body tooth surface 204 of the block body 102 engages with the plate tooth surface 208 of the plate member 104. Further, the pins 402a, 402b can be tightened to fasten the block assembly 100 against the grid surface 400. In at least one implementation, the block body movement and repositioning depicted in the scenarios 700, 800 occurs without movement of the plate member 104. For instance, during movement of the block body 102, the pins 402a, 402b remain engaged within respective pin apertures 210 within the plate member 104 and grid apertures 404 and thus hold the plate member 104 in position, thus preventing movement of the plate member 104 during movement of the block body 102. Accordingly, by maintaining attachment of the plate member 104 during movement of the block body 102, precise positioning of the block assembly 100 is enabled.

Figure 9:
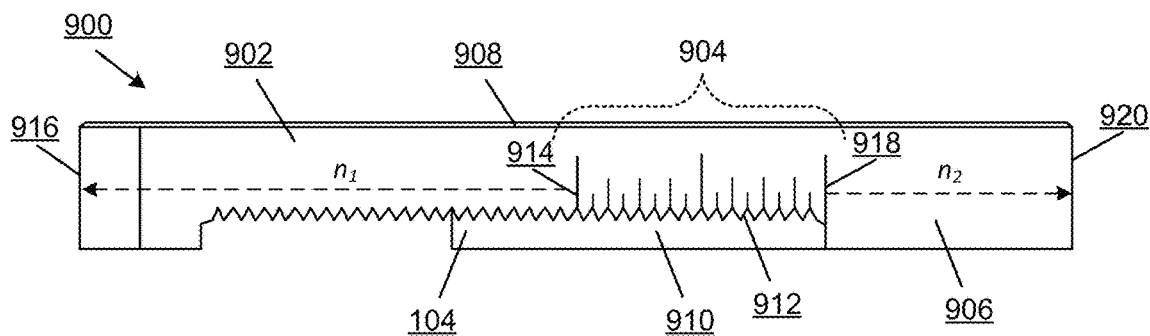
FIG. 9 depicts a block assembly in accordance with one or more implementations.

FIG. 9 depicts a block assembly 900 which represents a variation and/or extension of the block assembly 100 introduced above. The block assembly 900 includes a block body 902 engaged with the plate member 104. The block assembly 900 includes a scale region 904 on a side surface 906 of the block body 902. Generally, the scale region 904 is a visual representation of a particular linear measurement scale and includes linear measurement markings that each represent a particular linear measurement unit in the particular measurement scale. The linear measurement units in the scale region 904 can be configured using any suitable measurement system such as the Imperial measurement system (e.g., foot, inches, fractions of inches), the metric measurement system (e.g., centimeter, millimeter), and/or any other suitable linear measurement convention.

The scale region 904 can be applied to the side surface 906 using any suitable application technique, such as engraving into the side surface 906, painting onto the side surface 906, use of a sticker or other adhesive object that include the scale region 904 and that is applied to the side surface 906, and/or combinations thereof. Additionally or alternatively to applying the scale region 904 on the side surface 906, the scale region 904 can be applied to other regions of the block body 902 (e.g., a top surface 908), to the plate member 104 (e.g., on a side surface 910 of the plate member 104), and/or combinations thereof. In this particular example, scale marks of the scale region 904 are aligned with portions of a tooth surface 912 of the block body 902. Generally, this enables repositioning of the block body 902 relative to the plate member 104 to correspond to increments of the scale region 904, which is discussed in more detail below.

In at least one implementation, the scale region 904 is positioned at a predefined distance from a region and/or regions of the block body 902. For instance, consider that the scale region 904 is configured using measurement units u, e.g., wherein u represents metric units and/or Imperial units. In one example, a scale mark 914 of the scale region 904 is placed $n_1$ units of u from a front surface 916 of the block body 902. Consider, for example, that the scale region 904 represents units u of inches, e.g., two total inches with scale marks at $\frac{1}{8}^{th}$ inch increments. Accordingly, the scale mark 914 can be placed $n_1$ inches from the front surface 916, e.g., where $n_1=4$. As an alternative or additional implementation a scale mark 918 can be placed $n_2$ units of u from a rear surface 920 of the block body 902. For instance, utilizing the inches example above, the scale mark 918 is placed $n_2$ inches from the rear surface 920, e.g., where $n_2=2$. In at least one implementation the distance of the scale region 904 from a particular surface/surfaces of the block body 902 is visually marked on the block body 902, such as to visually indicate a number of units u that the scale region 904 is positioned from a particular surface of the block body 902. Generally, this provides for precise placement and repositioning of the block assembly 900. While the example above is described with reference to Imperial units, other suitable measurement systems can additionally or alternatively be utilized, such as metric units.

Figure 10A:
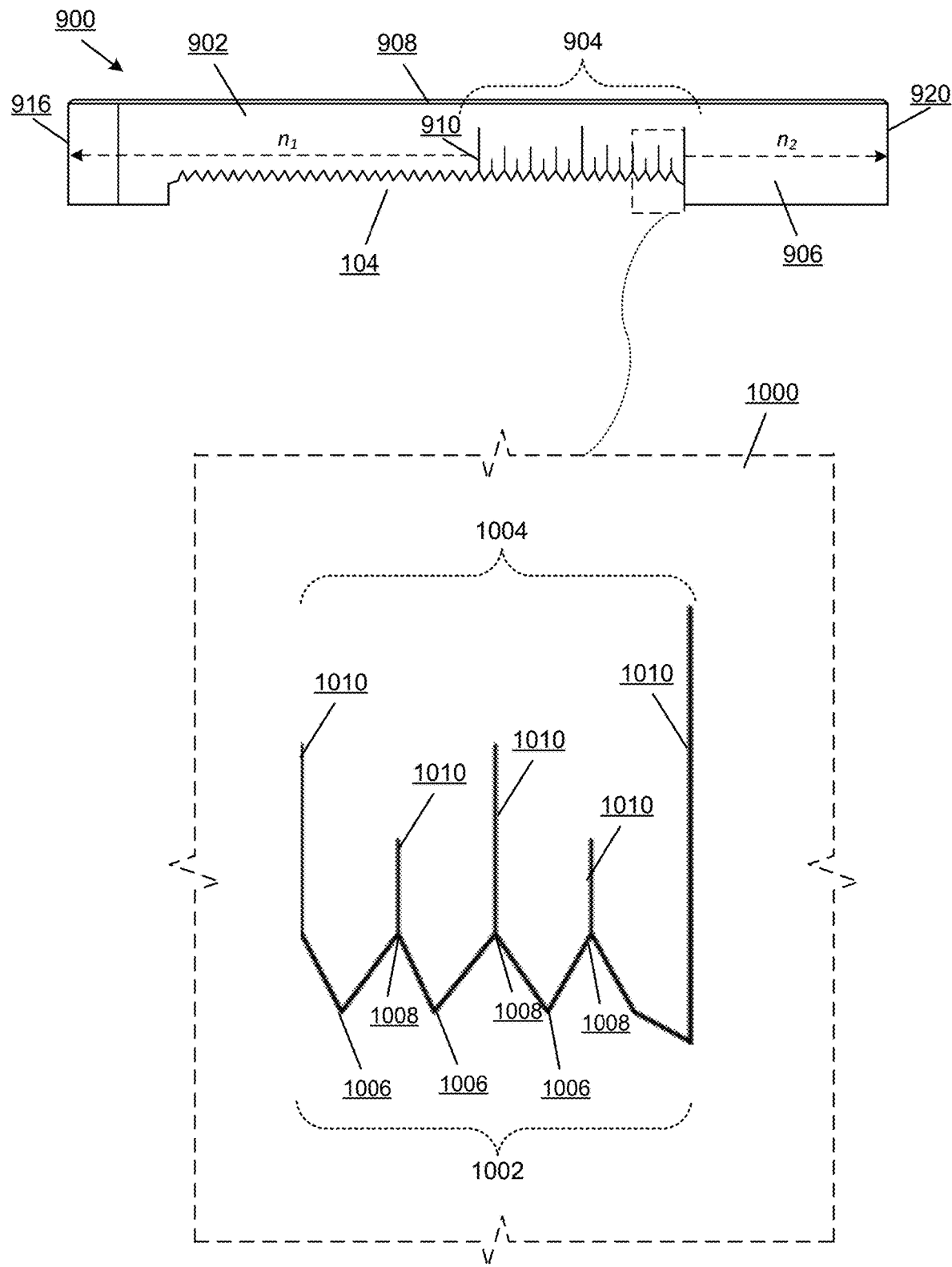
FIG. 10a depicts a detailed illustration of a block body section of a block body in accordance with one or more implementations.

FIG. 10a depicts a detailed illustration of a block body section 1000 of the block body 902 in accordance with one or more implementations. The block body section 1000 includes a tooth surface section 1002 of the tooth surface 912 and a scale region section 1004 of the scale region 904. The tooth surface section 1002 includes teeth 1006 and valleys 1008 between the teeth 1006, and the scale mark section 1004 includes scale marks 1010. In this particular example each scale mark 1010 is aligned with a particular valley 1008. Generally, this enables repositioning of the block body 902 relative to the plate member 104 to increment according to linear measurement units reflected in the scale marks 1010.

FIG. 10b depicts a scenario 1012 for repositioning of the block assembly 900 based on the scale region 904 in accordance with one or more implementations. In the upper section of the scenario 1012 the block assembly 900 is depicted as fastened to a grid surface 1014, such as described above. Proceeding to the lower section of the scenario 1012, the block body 902 is repositioned on the grid surface 1014 relative to the plate member 104. For instance, as described above, pins 1016a, 1016b are loosened and a user lifts the block body 902 and repositions the block body 902 while the plate member 104 remains fastened to the grid surface 1014.

In conjunction with repositioning the block body 902 an amount of movement of the block body 902 is reflected by alignment of the plate member 104 with the scale region 904. For instance, in the upper section of the scenario 1012 an edge 1018 of the plate member 104 is aligned with the scale mark 918 of the scale region 904. After repositioning the block body 902 the edge 1018 is aligned with a scale mark 1020 of the scale region 904. Accordingly a number of linear measurement units between the scale marks 918, 1020 indicates a distance of movement of the block body 902. In this particular example, the edge 1018 moves four scale marks from the scale mark 918 to the scale mark 1020 thus indicating that the block body 902 moved four linear measurement units. For instance, in an example where the scale region 904 is configured to indicate 2 total inches, the scale marks indicate $\frac{1}{8}^{th}$ inch increments and thus the block body 902 moved ½ inch. Thus, utilizing the scale region 904 to demarcate linear measurement units for movement of the block body 902 enables precise manipulation and placement of the block assembly 900.

Figure 10C:
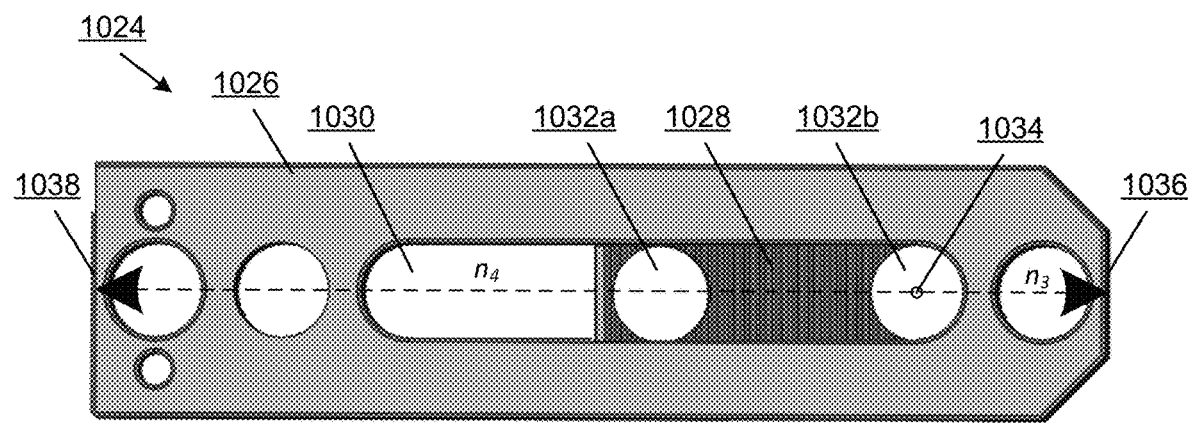
FIG. 10c depicts an implementation of a block assembly that utilizes a distance offset for a plate assembly in accordance with one or more implementations.

FIG. 10c depicts an implementation of a block assembly 1024 that utilizes a distance offset for a plate assembly in accordance with one or more implementations. The block assembly 1024 includes a block body 1026 and a plate member 1028 engaged with the block body 1026, such as via tooth surfaces on the block body 1026 and the plate member 1028, as described above. Generally, the block body 1026 and the plate member 1028 can incorporate various features and attributes of block bodies and plate members discussed throughout this disclosure.

Further, the block body 1026 includes a pin slot 1030 and the plate member 1028 includes pin apertures 1032a, 1032b that can be utilized for attachment of the block assembly 1024, such as to an adjacent surface, e.g., a gridded surface. In this particular example the pin aperture 1032*b* is positioned within the plate member 1028 such that with the plate member 1028 engaged with the block body 1026, a center 1034 of the pin aperture 1032*b* is offset from a front surface 1036 of the block body 1026 by a distance $n_3$ units. Alternatively or additionally, the center 1034 is offset from a rear surface 1038 of the block body 1026 by a distance of $n_4$ units. In at least one implementation, $n_3$, $n_4$ are non-integer values of a particular linear measurement unit, such as inches, centimeters, millimeters, etc.

FIG. 10*d* depicts a scenario 1040 illustrating aspects for implementing a distance offset utilizing a plate assembly in accordance with one or more implementations. The upper portion of the scenario 1040 includes the block assembly 1024 introduced above including the block body 1026 and the plate member 1028, and the block body 1026 includes a scale region 1042 on a side surface 1044 of the block body 1026. Further, the block assembly 1024 is attached to a grid surface 1046 via pins 1048*a*, 1048*b*. Depicted through the plate member 1028 are outlines of the pin apertures 1032*a*, 1032*b* in the plate member 1028 through which the pins 1048*a*, 1048*b* are placed to attach the block assembly 1024 to the grid surface 1046. The center 1034 of the pin aperture 1032*b* is also depicted at the distance $n_3$ from the front surface 1036 and the distance $n_4$ from the rear surface 1038.

As mentioned above, the distances $n_3$, $n_4$ are non-integer values of a particular linear measurement unit. For instance, consider that scale marks of the scale region 1042 are placed at increments of an inch, e.g., $\frac{1}{8}^{th}$ inch increments. Accordingly, the position of the center 1034 of the pin aperture 1032*b* can be positioned at an offset from $\frac{1}{8}^{th}$ inch increments, e.g., at a $\frac{1}{16}^{th}$ inch offset from the front surface 1036. For instance, with the plate member 1028 positioned at a rightmost engaged position relative to the block body 1026, the distance $n_3$ represents an integer value n' of units u from the front surface 1036 plus an offset value o. Utilizing units u of inches, for example, n'=2, o=$\frac{1}{16}^{th}$, and thus $n_3$=2 and $\frac{1}{16}^{th}$ inches from the front surface 1036. The distance $n_4$ may also be positioned using a similar offset value and/or a variation on the offset value.

Proceeding to the lower portion of the scenario 1040, the block body 1026 is repositioned on the grid surface 1046 relative to the plate member 1028. For instance, as described above, pins 1048*a*, 1048*b* are loosened and a user lifts the block body 1026 and repositions the block body 1026 while the plate member 1028 remains fastened to the grid surface 1046.

In conjunction with repositioning the block body 1026 an amount of movement of the block body 1026 is reflected by alignment of the plate member 1028 with the scale region 1042. For instance, in the upper section of the scenario 1040 an edge 1050 of the plate member 1028 is aligned with a scale mark 1052 of the scale region 1042. After repositioning the block body 1026 the edge 1050 is aligned with a scale mark 1054 of the scale region 1042. Accordingly a number of linear measurement units between the scale marks 1052, 1054 indicates a distance of movement of the block body 1026. In this particular example, the edge 1050 moves three scale marks from the scale mark 1052 to the scale mark 1054 thus indicating that the block body 1026 moved three linear measurement units. For instance, in an example where the scale marks of the scale region 1042 positioned at $\frac{1}{8}^{th}$ inch increments, this indicates that the block body 1026 moved $\frac{3}{8}$ inch. Further, considering the offset distance of the center 1034 of the pin aperture 1032*b*, the center 1034 is now a distance of $n_5$ from the front surface 1036, wherein $n_5$=$n_3$+$\frac{3}{8}$. For instance, where $n_3$=2 and $\frac{1}{16}^{th}$ inches, $n_5$=2 and $\frac{7}{16}^{th}$ inches. Thus, while movement of the block body 1026 relative to the plate member 1028 occurs in $\frac{1}{8}^{th}$ increments (e.g., based on pitch distances of the teeth of the block body 1026 and the plate member 1028), the distance between the plate member 1028 and the front surface 1036 and/or the rear surface 1038 occurs offset by the offset value o, e.g., $\frac{1}{16}^{th}$ inch offsets.

Generally, different plate members with no offset values and/or different offset values can be utilized to enable movement of a block assembly accordingly to different offsets, e.g., to enable surfaces of a block body to be positioned based on different measurement units and offset values to accommodate a variety of different usage scenarios.

Figure 11A:
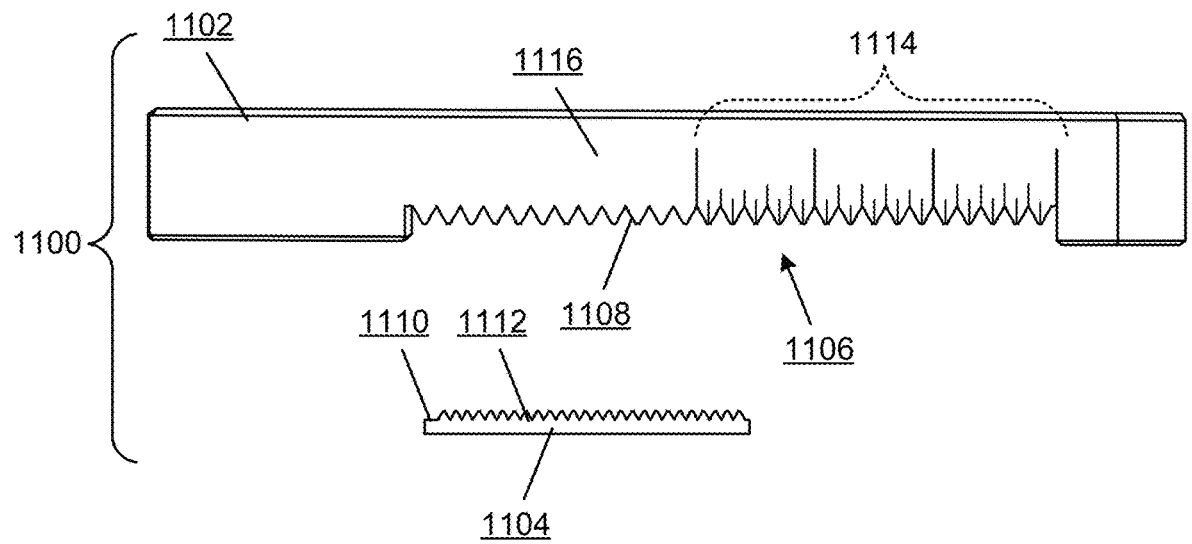
FIG. 11a depicts a block assembly that utilizes differing tooth patterns in accordance with one or more implementations.

FIG. 11*a* depicts a block assembly 1100 that utilizes differing tooth patterns in accordance with one or more implementations. The block assembly 1100, for instance, represents an extension and/or variation of the block assemblies described above and/or below. The block assembly 1100 includes a block body 1102 and a plate member 1104 which are illustrated in FIG. 11*a* as being disengaged from one another. The block body 1102 forms an interior surface 1106 which includes a body tooth surface 1108, and the plate member 1104 includes a top surface 1110 which includes a plate tooth surface 1112. The block body 1102 also includes a scale region 1114 formed on a side surface 1116 of the block body 1102 and adjacent a portion of the body tooth surface 1108.

Notice in this particular example that the plate tooth surface 1112 exhibits a differing tooth pattern than the body tooth surface 1108. The plate tooth surface 1112, for instance, has smaller teeth and a finer (e.g., more dense) tooth pattern (e.g., smaller tooth pitch) than the body tooth surface 1108. In at least one implementation this enables for fine adjustment and positioning of the block body 1102 relative to the plate member 1104. This example is not to be construed as limiting, however, and other implementations can utilize a plate tooth surface 1112 with a coarser tooth pattern, e.g., larger tooth pitch.

Figure 11B:
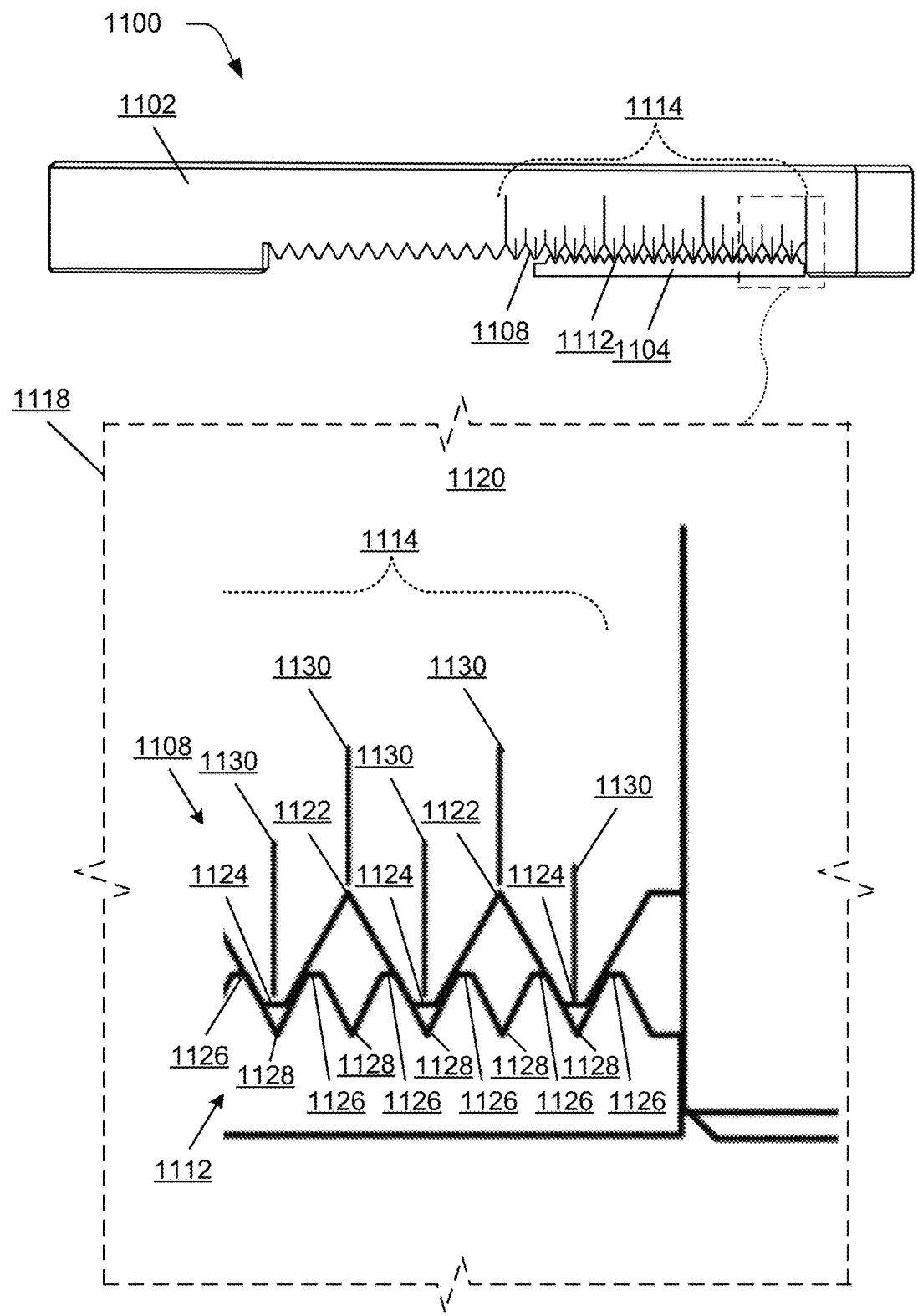
FIG. 11b depicts a block assembly with a block body and a plate member engaged in accordance with one or more implementations.

FIG. 11*b* depicts the block assembly 1100 with the block body 1102 and the plate member 1104 engaged. The body tooth surface 1108, for instance, is engaged with the plate tooth surface 1112. FIG. 11*b* also depicts a close up view 1118 of a section 1120 of the block assembly 1100 showing engagement of the body tooth surface 1108 with the plate tooth surface 1112. The body tooth surface 1108 includes teeth 1122 and valleys 1124 between the teeth 1122 and the plate tooth surface 1112 includes teeth 1126 and valleys 1128 between the teeth 1126. In this particular example the teeth 1122 of the body tooth surface 1108 engage with every other valley 1128 of the plate tooth surface 1112. Further, the distance between the teeth 1122 is greater than the distance between the teeth 1126. Thus, the body tooth surface 1108 exhibits a different tooth pitch distance than the plate tooth surface 1112. As mentioned above, utilizing this differential in tooth size and/or spacing between the body tooth surface 1108 and the plate tooth surface 1112 enables for fine adjustment of the block body 1102 relative to the plate member 1104.

Notice also that scale marks 1130 of the scale region 1114 are placed at each tooth 1122 and each valley 1124 to enable precise measurement of movement of the block body 1102 relative to the plate member 1104. Generally, the scale region 1114 and the scale marks 1130 can be configured accordingly to any particular linear measurement scale, such as in Imperial and/or metric linear measurement units. Further, the scale marks 1130 are positioned to coincide with instances of a tooth 1122 and/or a valley 1124.

Accordingly, the block assembly 1100 illustrates that differential tooth sizes and/or tooth patterns can be utilized to provide for different adjustability options for block assemblies. For instance, tooth bodies and plate members with different tooth patterns are provided to support a variety of different adjustability and operating implementations.

Figure 12:
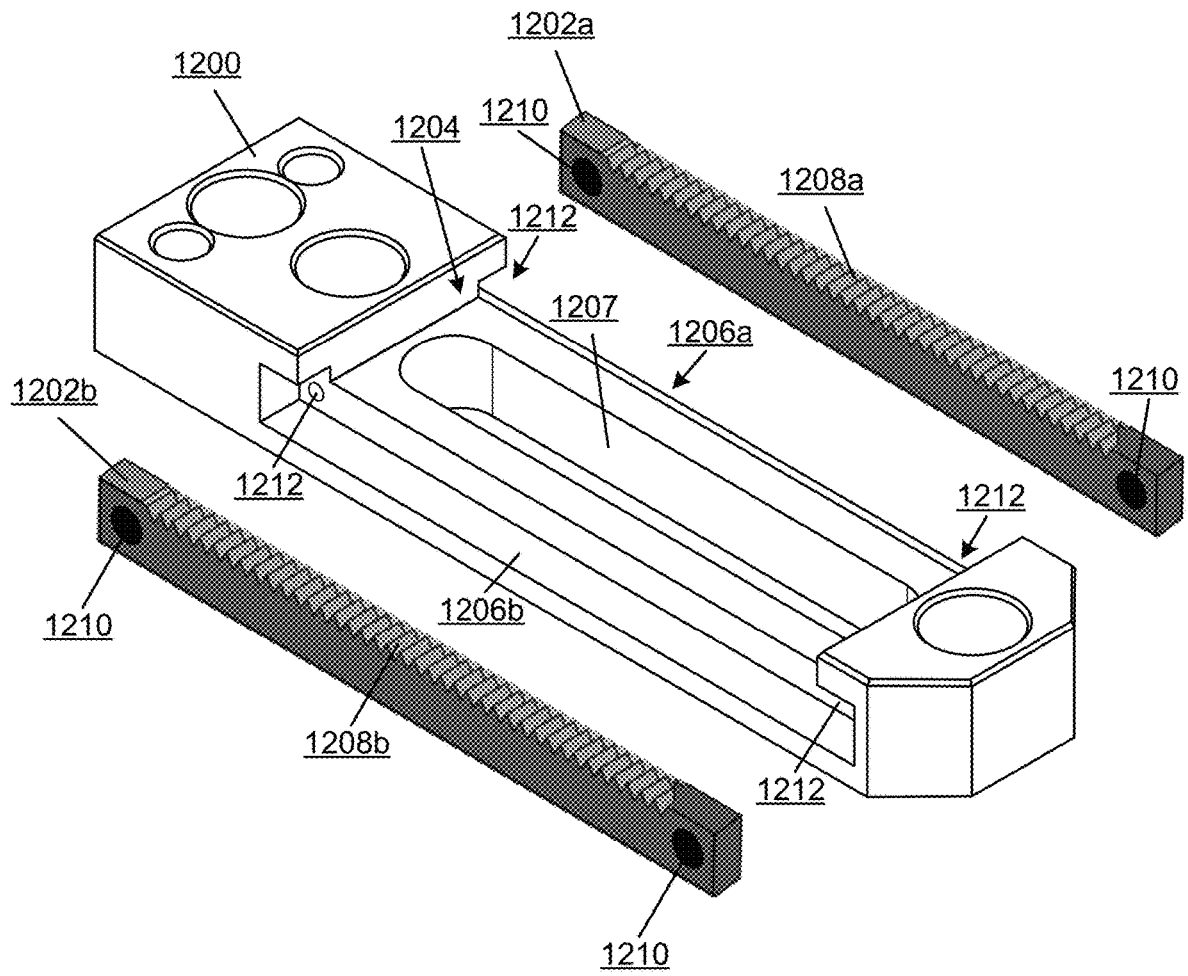
FIG. 12 depicts an implementation of a block body that utilizes modular attachable tooth fittings in accordance with one or more implementations.

FIG. 12 depicts an implementation of a block body 1200 that utilizes modular attachable tooth fittings 1202a, 1202b in accordance with one or more implementations. The block body 1200 forms an interior surface 1204 that includes a fitting cavity 1206a and a fitting cavity 1206b. The fitting cavities 1206 extend longitudinally along the block body 1200 and codirectionally with a pin slot 1207. Further, the tooth fitting 1202a includes a tooth surface 1208a and the tooth fitting 1202b includes a tooth surface 1208b. The fitting cavities 1206a, 1206b are formed to enable the tooth fittings 1202a, 1202b to be inserted into the fitting cavities 1206 such that the tooth surfaces 1208a, 1208b enable the block body 1200 to be utilized as part of a block assembly, such as described above.

The tooth fittings 1202 can be fastened into the fitting cavities 1206 utilizing any suitable attachment technique, such as using fasteners, adhesive, press fitting, and so forth. In this particular example the tooth fittings 1202 include apertures 1210 through which fasteners can be placed to attach the tooth fittings 1202 within the fitting cavities 1206. Further, the block body 1200 includes apertures 1212 within the fitting cavities 1206 and into which fasteners can be placed to attach the tooth fittings 1202 into the fitting cavities 1206. The apertures 1212, for instance, are tapped and can received a threaded fastener.

Figure 13:
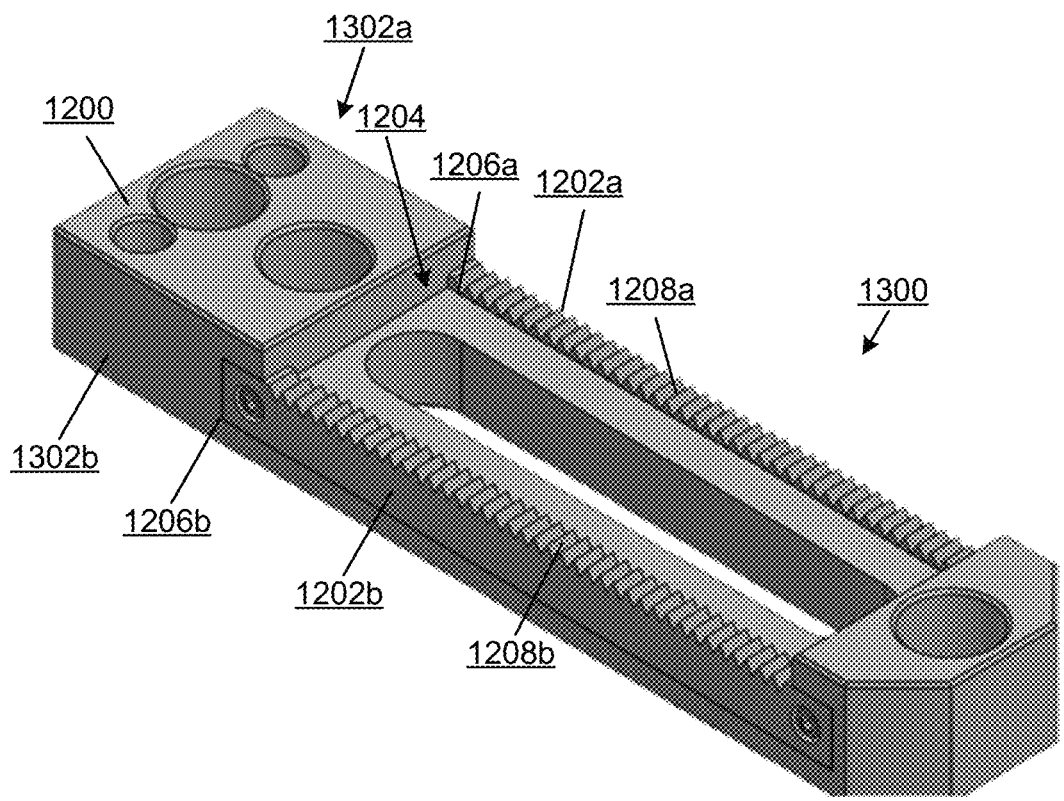
FIG. 13 depicts a block body with tooth fittings attached to form a block body assembly in accordance with one or more implementations.

FIG. 13 depicts the block body 1200 with the tooth fittings 1202 attached to form a block body assembly 1300 in accordance with one or more implementations. The block body assembly 1300, for instance, represents an instance of the various block bodies discussed herein. In the block body assembly 1300 the tooth fittings 1202 are positioned within the fitting cavities 1206 and fastened using any suitable fastening technique. Notice that when positioned within the fitting cavities 1206, the tooth surfaces 1208 extend outwardly and protrude from the interior surface 1204 of the block body 1200. Generally, this enables the tooth surfaces 1208 to engage with a plate member as part of a block assembly. In this particular example with the tooth fittings 1202 engaged within the fitting cavities 1206, the tooth fittings 1202a, 1202b are substantially coplanar, respectively, with side surfaces 1302a, 1302b of the block body 1200.

Figure 14:
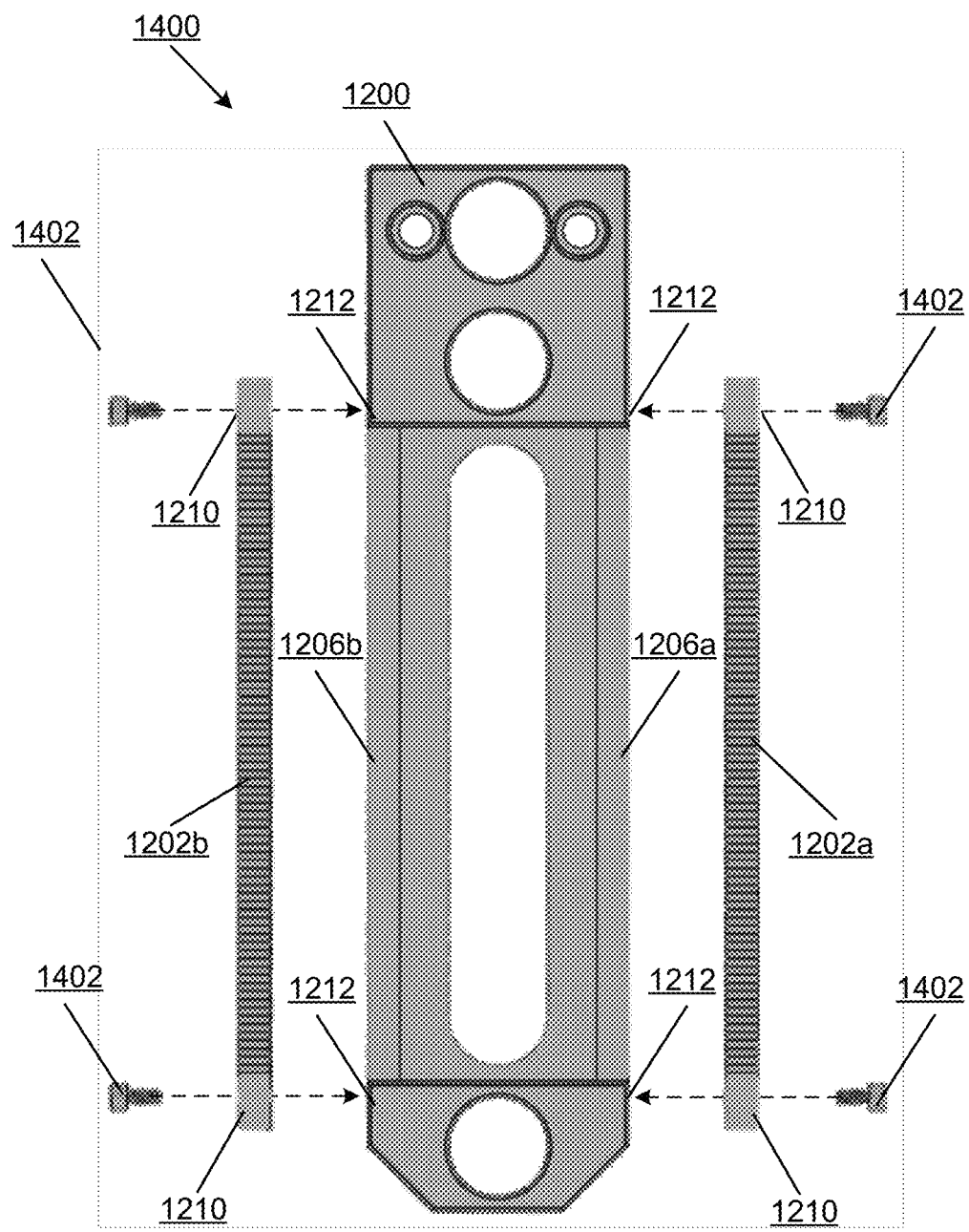
FIG. 14 depicts a bottom view of a block body and tooth fittings arranged for attachment in accordance with one or more implementations.

FIG. 14 depicts a bottom view 1400 of the block body 1200 and the tooth fittings 1202 arranged for attachment. Also depicted are fasteners 1402 used to fasten the tooth fittings 1202 within the fitting cavities 1206. To fasten the tooth fittings 1202 into the fitting cavities 1206, the fasteners 1402 are inserted through the apertures 1210 in the tooth fittings 1202 and into the apertures 1212 in the fitting cavities 1206. The fasteners 1402, for instance, are threaded and the apertures 1212 are tapped to receive threaded attachment of the fasteners 1402 to enable fastening of the tooth fittings 1202 into the fitting cavities 1206.

Figure 15:
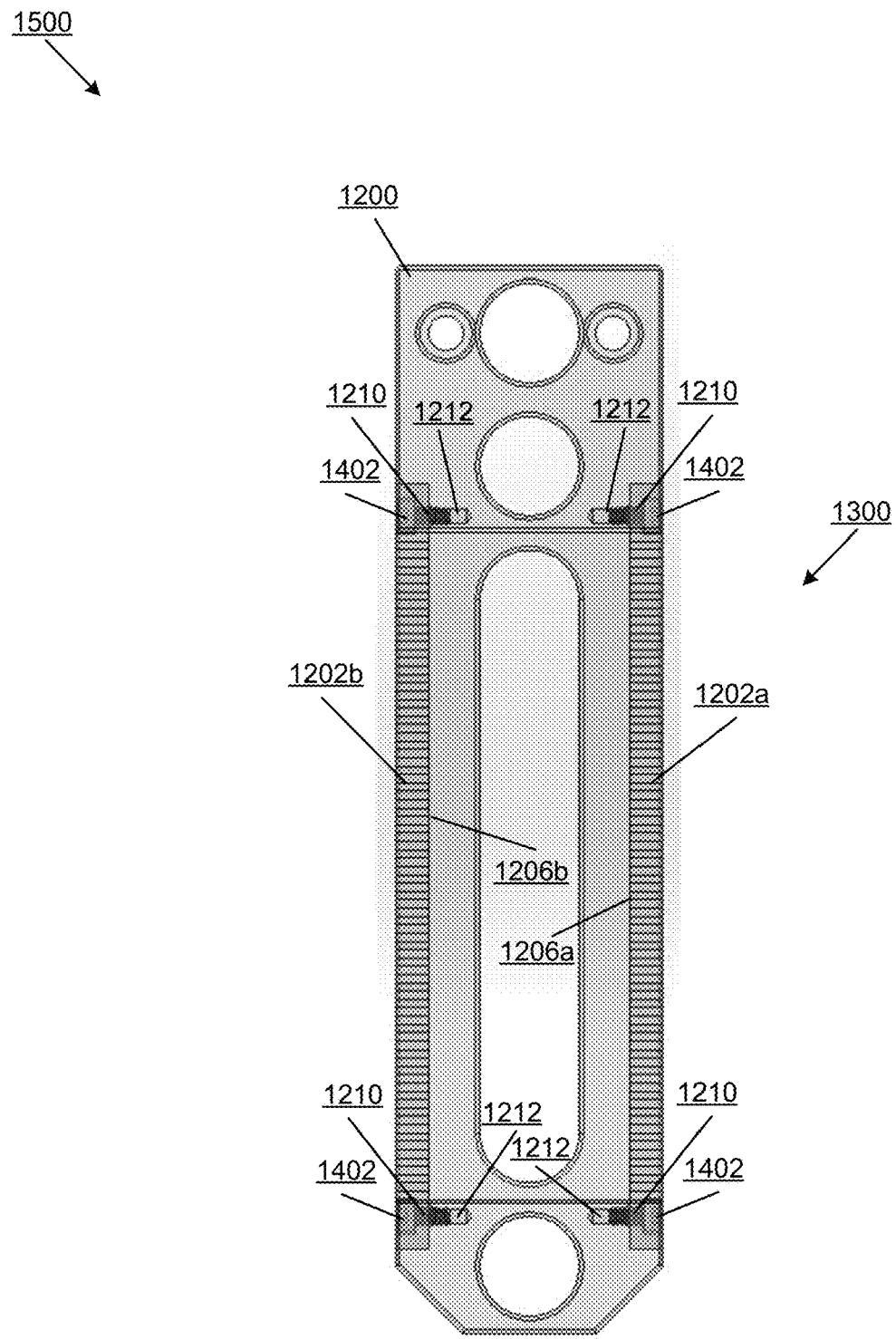
FIG. 15 depicts a transparent view of a block body assembly with tooth fittings attached in accordance with one or more implementations.

FIG. 15 depicts a transparent view 1500 of the block body assembly 1300 with the tooth fittings 1202 attached within the fitting cavities 1206. The transparent view 1500 illustrates that the fasteners 1402 are inserted through the apertures 1210 in the tooth fittings 1202 and fastened into the apertures 1212 positioned within the fitting cavities 1206 of the block body 1200 to form the block body assembly 1300. The fasteners 1402 can be attached within the apertures 1212 using any suitable attachment technique, such as threaded attachment, adhesive, press fitting, etc. Accordingly, the block body assembly 1300 is usable as part of a block assembly such as described throughout this disclosure.

While the block body assembly 1300 is illustrated in the context of attachment of the tooth fittings 1202 within the fitting cavities 1206, this is not to be construed as limiting and alternative implementations can utilize attachment to an exterior side surface of a conventional block member, e.g., a stop block that does not include fitting cavities for attachment. Thus, the tooth fittings 1202 can be used to convert a conventional stop block into a block body assembly for use as described throughout this disclosure. Further, tooth fittings 1202 with different tooth sizes and tooth patterns can be utilized to provide for a variety of different usage scenarios.

Figure 16:
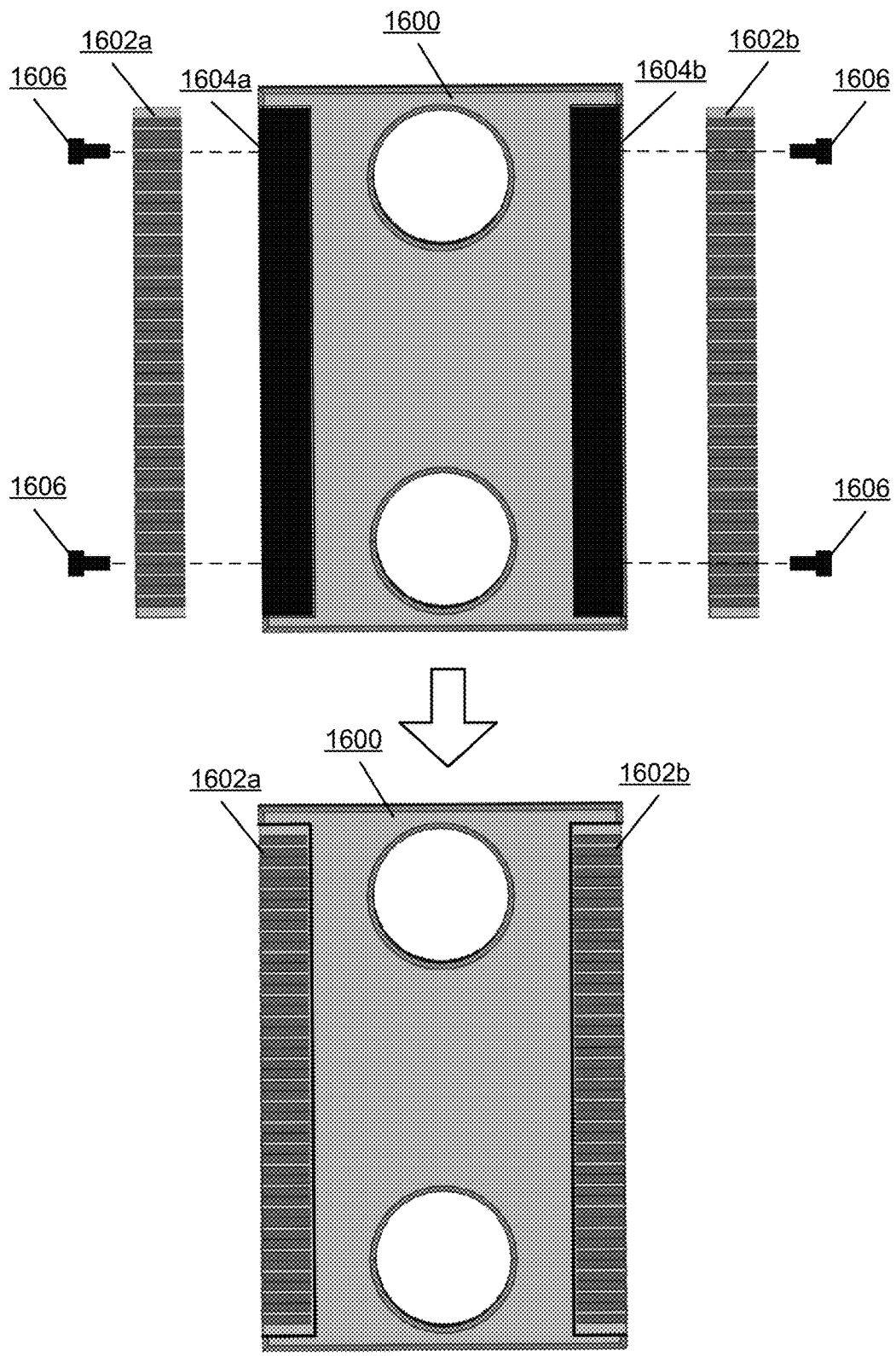
FIG. 16 depicts an implementation of a plate member that utilizes attachable tooth fittings in accordance with one or more implementations.

FIG. 16 depicts an implementation of a plate member 1600 that utilizes attachable tooth fittings 1602a, 1602b in accordance with one or more implementations. The plate member 1600, for instance, represents an extension and/or variation of the plate members described above and thus incorporates at least some of the features previously described. The tooth fittings 1602a, 1602b are attachable within fitting cavities 1604a, 1604b, respectively, via fasteners 1606. The plate member 1600, for instance, includes tapped apertures into which the fasteners 1606 can be inserted via threaded attachment to attach the tooth fittings 1602a, 1602b via threaded attachment. Alternatively or additionally any other suitable attachment method can be utilized such as adhesive, press fitting, etc.

The lower portion of FIG. 16 illustrates the plate member 1600 with the tooth fittings 1602a, 1602b attached within the fitting cavities 1604a, 1604b, e.g., via the fasteners 1606. Accordingly, the plate member 1600 can be utilized within the context of a block assembly such as described throughout this disclosure. While the plate member 1600 is illustrated in the context of attachment of the tooth fittings 1602a, 1602b within the fitting cavities 1604a, 1604b, this is not to be construed as limiting and alternative implementations can utilize attachment to an exterior side surface of a plate to generate a plate member, e.g., a plate that does not include fitting cavities for attachment. Further, tooth fittings 1602 with different tooth sizes and tooth patterns can be utilized to provide for a variety of different usage scenarios.

Thus, the block body assembly 1300 and the plate member 1600 illustrate that modular tooth fittings can be utilized to provide for different usage implementations such as by utilizing tooth fittings with different tooth size, different tooth patterns, etc.

Figure 17:
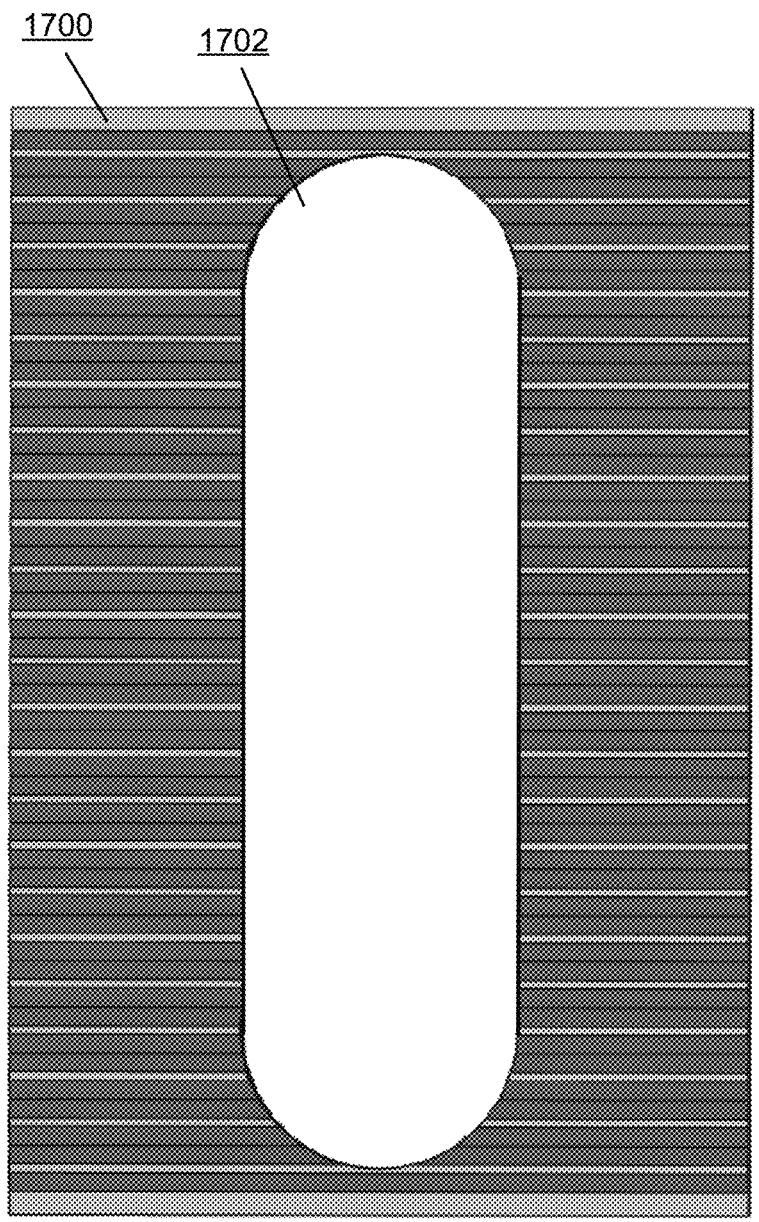
FIG. 17 depicts a plate member that includes a pin slot for pin placement in accordance with one or more implementations.

FIG. 17 depicts a plate member 1700 that includes a pin slot 1702 for pin placement, e.g., alternatively to the circular pin apertures described previously. In this particular example the pin slot 1702 forms an extended oval slot extending longitudinally along the length of the plate member 1700. The pins 402 described above, for instance, can be placed within a pin slot of a block body and through the pin slot 1702 to provide an implementation of a block assembly. In at least one implementation utilizing the plate member 1700 with the pin slot 1702 provides for increased adaptability for a block assembly, such as to accommodate grid surfaces with different grid aperture patterns, grid aperture sizes, grid aperture sizes, and so forth.

Figure 18:
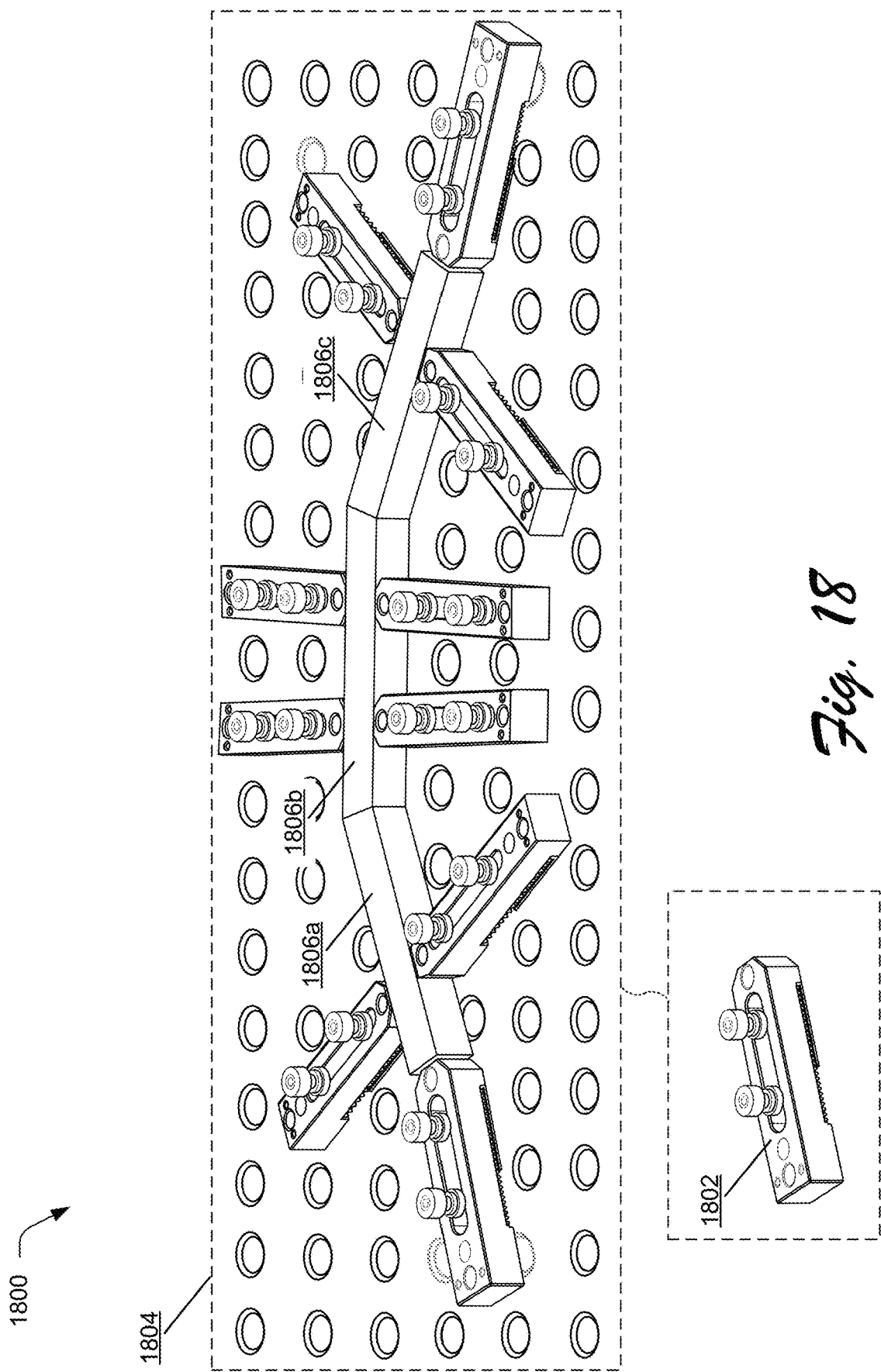
FIG. 18 depicts an example usage scenario which utilizes a set of block assemblies in accordance with one or more implementations.

FIG. 18 depicts an example usage scenario 1800 which utilizes a set of block assemblies 1802, each of which represent an instance of any implementation or combination of implementations of the block assemblies described herein. In the scenario 1800 the block assemblies 1802 are fastened to a grid surface 1804 and are utilized to position and secure a set of workpieces 1806 including a workpiece 1806a, a workpiece 1806b, and a workpiece 1806c. The workpieces 1806, for instance, are position and secured to enable work to be applied to the workpieces 1806, such as for joining the workpieces 1806. Generally, by utilizing the block assemblies 1802, the workpieces 1806 are able to be precisely and securely positioned to enable work to be applied to the workpieces 1806 without unintended movement of the workpieces 1806 while work is being applied.

Figure 19:
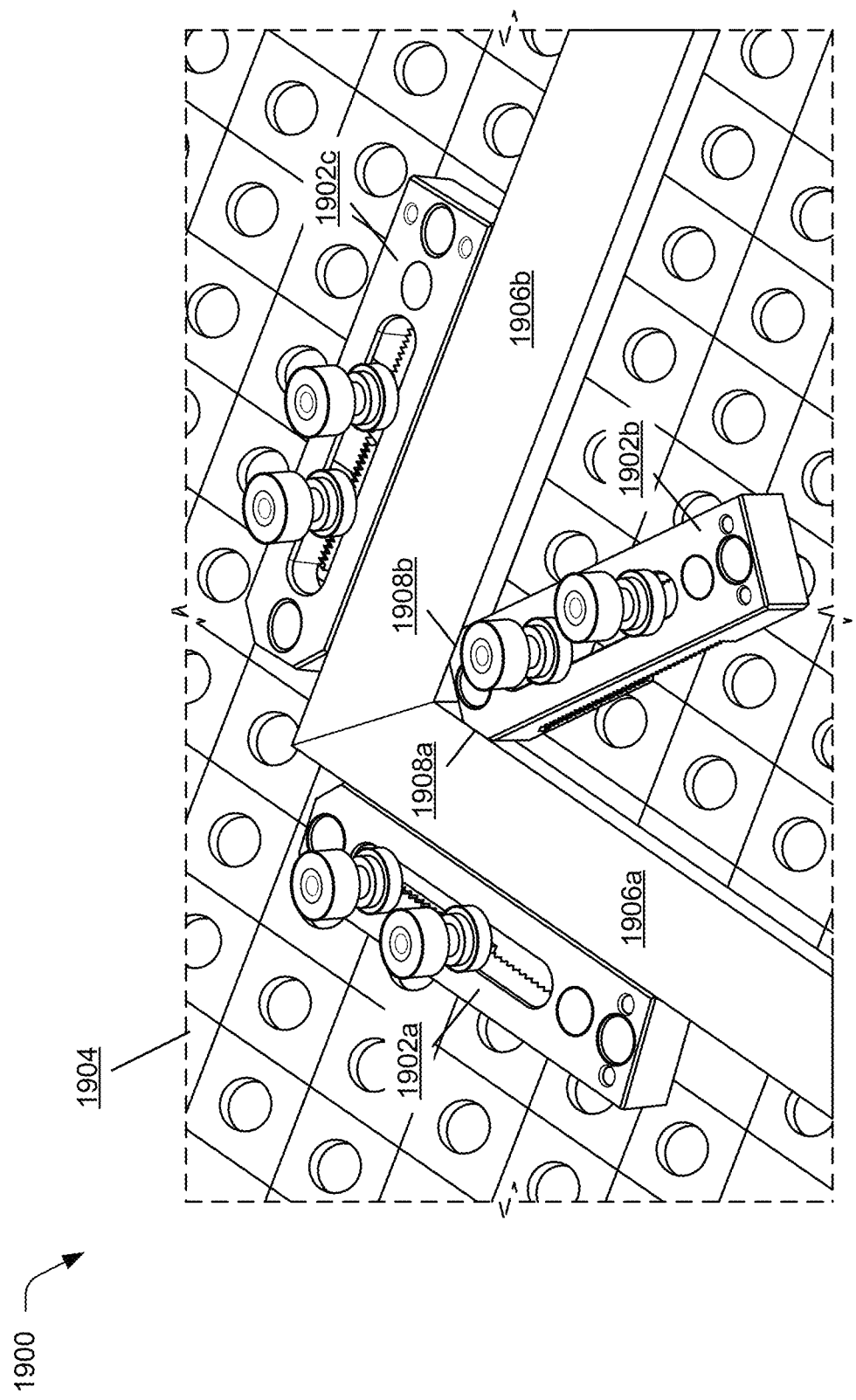
FIG. 19 depicts an example usage scenario which utilizes a set of block assemblies in accordance with one or more implementations.

FIG. 19 depicts an example usage scenario 1900 which utilizes a set of block assemblies 1902a, 1902b, 1902c, each of which represent an instance of any implementation or combination of implementations of the block assemblies described herein. In the scenario 1900 the block assemblies 1902 are fastened to a grid surface 1904 and are utilized to position and secure a set of workpieces 1906 including a workpiece 1906a and a workpiece 1906b. In this particular example notice that angled surfaces 1908a, 1908b of the block assembly 1902b are used to secure edges of the workpieces 1906a, 1906b where the workpieces 1906 meet, e.g., at an angled joint between the workpieces 1906. Thus, various surfaces of the described block assemblies are able to be utilized to support a variety of different workpiece arrangements and configurations.

Figure 20:
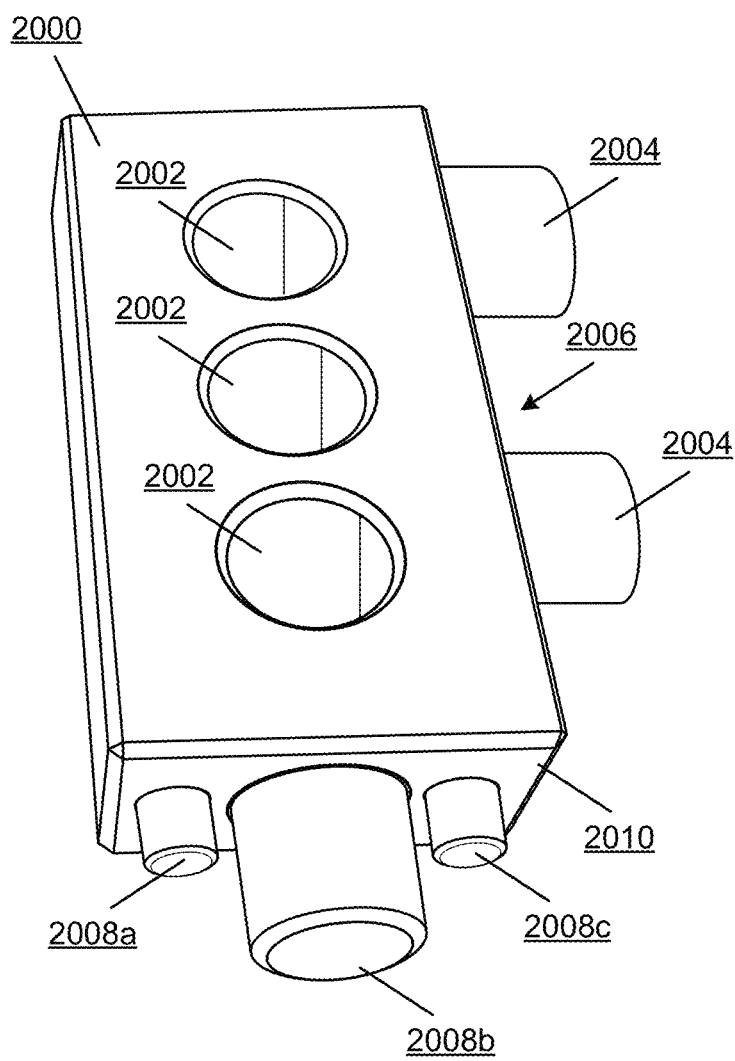
FIG. 20 depicts an accessory block that can be utilized in conjunction with a block assembly in accordance with one or more implementations.

FIG. 20 depicts an accessory block 2000 that can be utilized in conjunction with a block assembly to support different working scenarios. The accessory block 2000 forms apertures 2002 into which various materials and tools are placeable, such as doweling, piping, clamps, and so forth. The accessory block 2000 also includes pins at different locations to support attachment for different operating scenarios. For instance, pins 2004 on a side 2006 of the accessory block 2000 enable attachment of accessories to the side of the accessory block, such as via placement of the pins 2004 into apertures of an accessory, e.g., another accessory block 2000. Further, pins 2008a, 2008b, 2008c on a bottom surface 2010 of the accessory block 2000 enable attachment of the accessory block 2000 to another object such as a block assembly. Generally, the pins 2008 can be attached into apertures within bottom surface 2010 in different ways, such as via threaded attachment, adhesive, press fitting, etc. Alternatively the pins 2008 can be formed as features of the accessory block 2000, such as machined features and/or cast features such that the accessory block 2000 and the pins 2008 (and optionally the pins 2004) are formed from a single piece of material.

Figure 21:
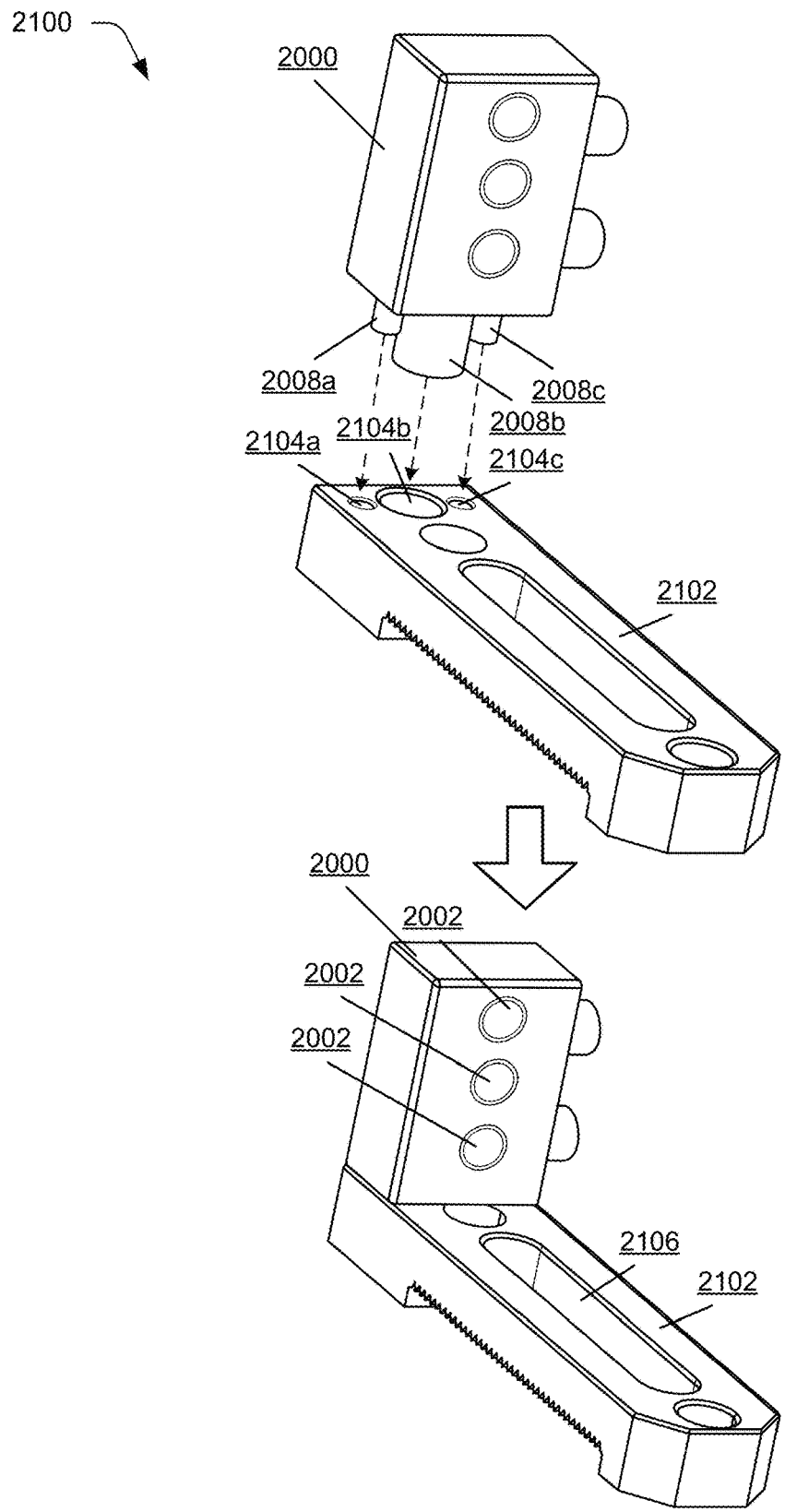
FIG. 21 depicts an example implementation scenario for attachment of an accessory block in accordance with one or more implementations.

FIG. 21 depicts an example implementation scenario 2100 for attachment of the accessory block 2000 to a block body 2102. In the upper portion of the scenario 2100 the pins 2008 are aligned with apertures 2104a, 2104b, 2104c formed within the block body 2102. Proceeding to the lower portion of the scenario 2100 the pins 2008 are placed into the apertures 2104 to fasten the accessory block 2000 to the block body 2102. In at least one implementation the pins 2008 are attached within the apertures 2104 via frictional attachment between the pins 2008 and the apertures 2104. Accordingly, the block body 2102 with the attached accessory block 2000 can be used for various purposes, such as for attachment of the block body 2102 to a grid surface and placement of workpieces and/or tools within the apertures 2002. The block body 2102, for instance, can be combined with a plate member to form a block assembly as described throughout and then attached to a grid surface. Alternatively the block body 2102 can be attached to a grid surface without a plate member such as via pin placement through a pin slot 2106 to enable the block body 2102 and the accessory block 2000 to be used for workpiece and/or tool placement.

Figure 22:
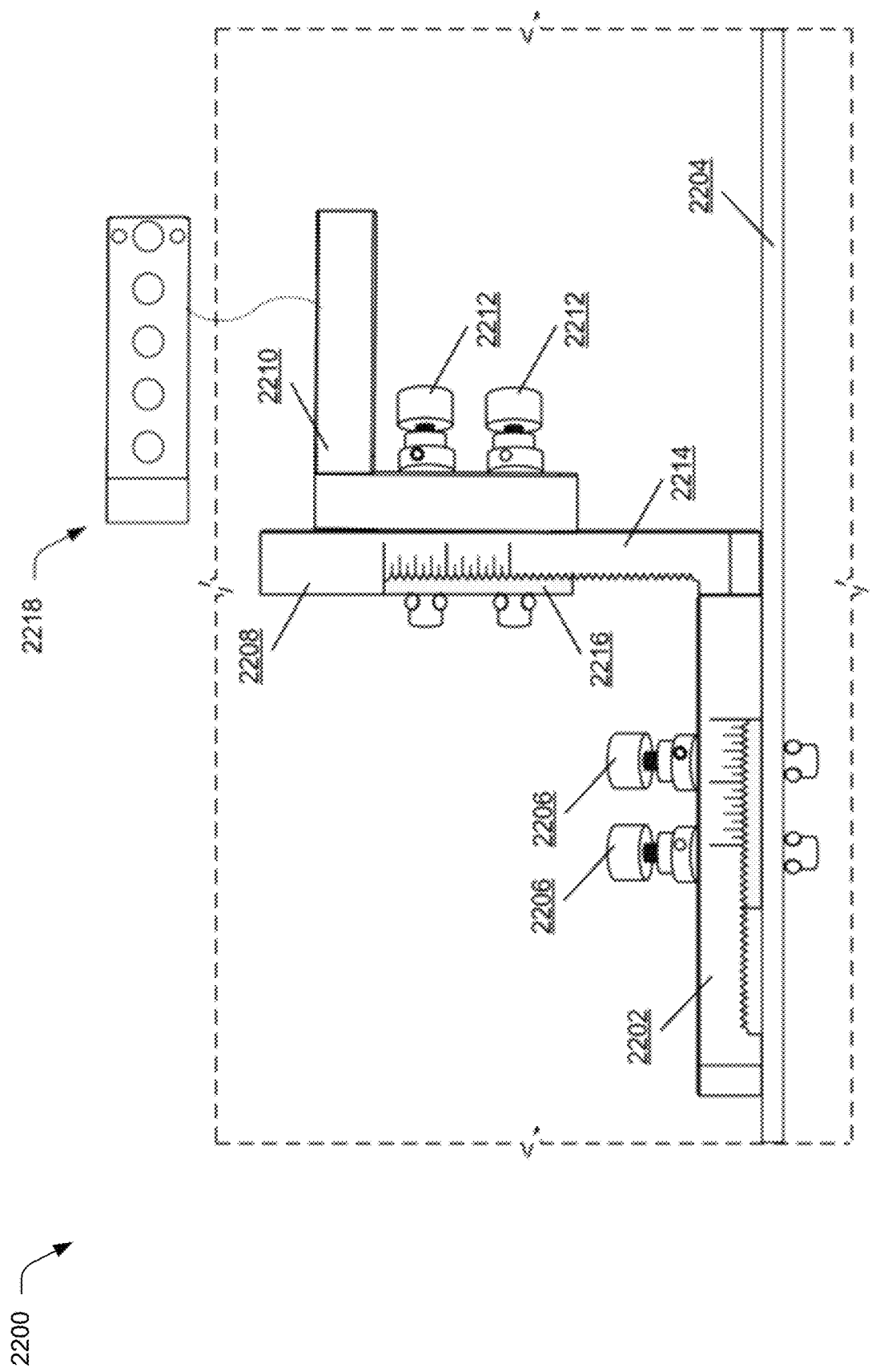
FIG. 22 depicts a scenario for utilizing a block assembly in a vertical orientation in accordance with one or more implementations.

FIG. 22 depicts a scenario 2200 for utilizing a block assembly in a vertical orientation in accordance with one or more implementations. In the scenario 2200 a block assembly 2202 is attached to a grid surface 2204 via pin attachment using pins 2206, such as described above. Further, a block assembly 2208 is attached to the block assembly 2202 in a vertical orientation relative to the grid surface 2204. The block assembly 2208 can be attached to the block assembly 2202 via any suitable attachment mechanism, such as threaded fasteners, friction pins, another form of attachment pin, and so forth.

Further to the scenario 2200, a bracket 2210 is secured to the block assembly 2208 via pins 2212. The pins 2212, for instance, are placed through apertures and/or a pin slot in the bracket 2210, through a pin slot in a block body 2214 of the block assembly 2208, and through apertures and/or a pin slot of a plate member 2216 of the block assembly. The pins 2212 are tightened to secure the bracket 2210 to the block assembly 2208. Accordingly, the pins 2212 can be loosened to enable the plate member 2216 to move vertically up and down relative to the block body 2214 and to enable corresponding vertical movement of the bracket 2210 relative to the grid surface 2204. Generally, this enables precise movement of the bracket 2210 to achieve specific vertical orientations of the bracket 2210. Further, the block assembly 2202 can be moved horizontally along the grid surface 2204 such as described above to enable horizontal movement of the bracket 2210 relative to the grid surface 2204. Accordingly, this arrangement enables precise vertical and horizontal positioning of the bracket 2210 to achieve a variety of different operating positions.

At 2218 a top view of the bracket 2210 is illustrated showing that the bracket 2210 includes various apertures into which various workpieces and tools can be placed to enable a variety of different working scenarios.

Figure 23:
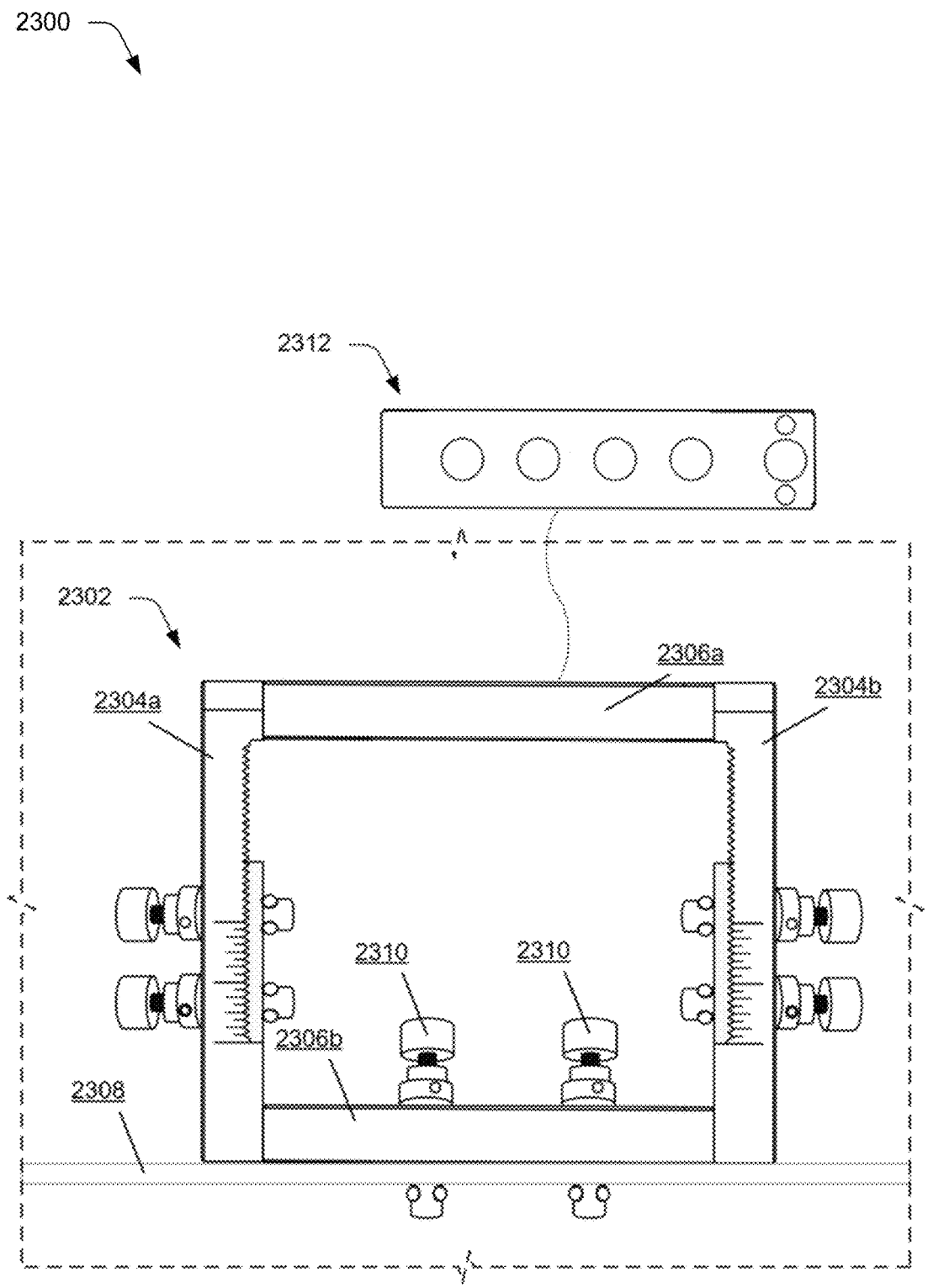
FIG. 23 depicts a scenario for utilizing block assemblies in a joined configuration with other blocks in accordance with one or more implementations.

FIG. 23 depicts a scenario 2300 for utilizing block assemblies in a joined configuration with other blocks in accordance with one or more implementations. In the scenario 2300 a block arrangement 2302 is illustrated including a set of block assemblies 2304a, 2304b attached to a set of block members 2306a, 2306b using any suitable attachment mechanism such as such as threaded fasteners, friction pins, another form of attachment pin, and so forth. Further, the block arrangement 2302 is attached to a grid surface 2308 via pins 2310 placed through apertures and/or a pin slot within the block member 2306b to secure the block member 2306b to the grid surface 2308. At 2312 a top view of the bracket block member 2306a is illustrated showing that the block member 2306a includes various apertures into which various workpieces and tools can be placed to enable a variety of different working scenarios. Accordingly, the block arrangement 2302 supports a variety of different operating scenarios. For instance, additional blocks can be secured to the block assemblies 2304 to provide for additional workpiece arrangement scenarios. Further, although the block arrangement 2302 is depicted as secured to the grid surface 2308, in additional or alternative implementations the block arrangement 2302 can be utilized without attachment to an adjacent surface, e.g., as a standalone block assembly for workpiece and/or tool arrangement.

Figure 24:
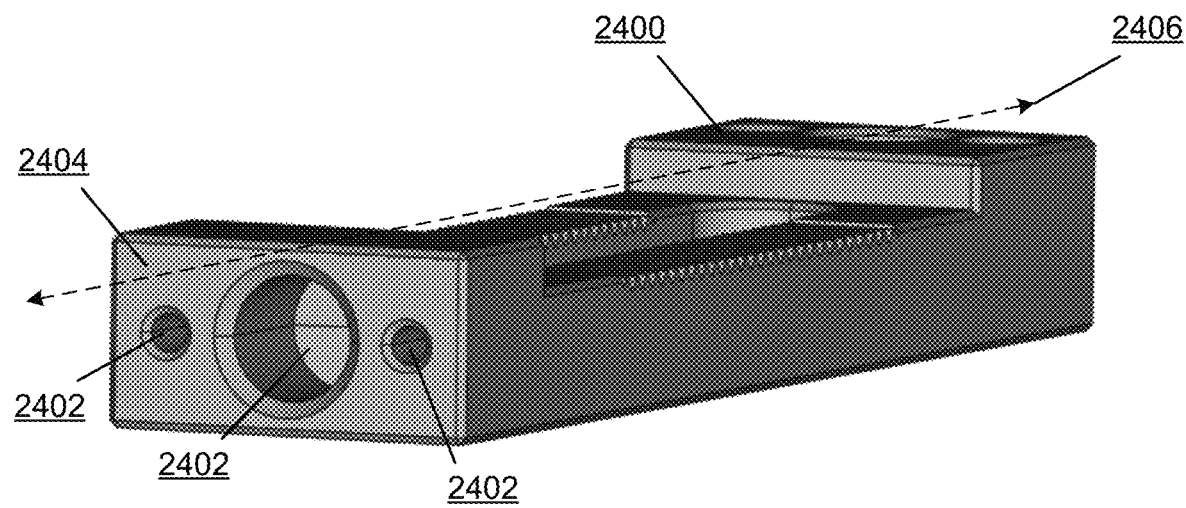
FIG. 24 depicts an example implementation of a block body with longitudinal apertures in accordance with one or more implementations.

FIG. 24 depicts an example implementation of a block body 2400 with longitudinal apertures, which represents a variation and/or extension of the different block bodies discussed herein. The block body 2400 includes apertures 2402 formed within an end surface 2404 of the block body 2400. The apertures 2402, for instance, are formed within the end surface 2404 codirectionally with a longitudinal axis 2406 of the block body 2400. Generally, the apertures 2402 support attachment of various objects to the block body 2400, such as other block bodies, accessory blocks, accessories, and so forth. The apertures 2402 can be formed in various ways, such as with tapped threads for threaded attachment, smooth interiors, counterbored configuration, and so forth.

Figure 25:
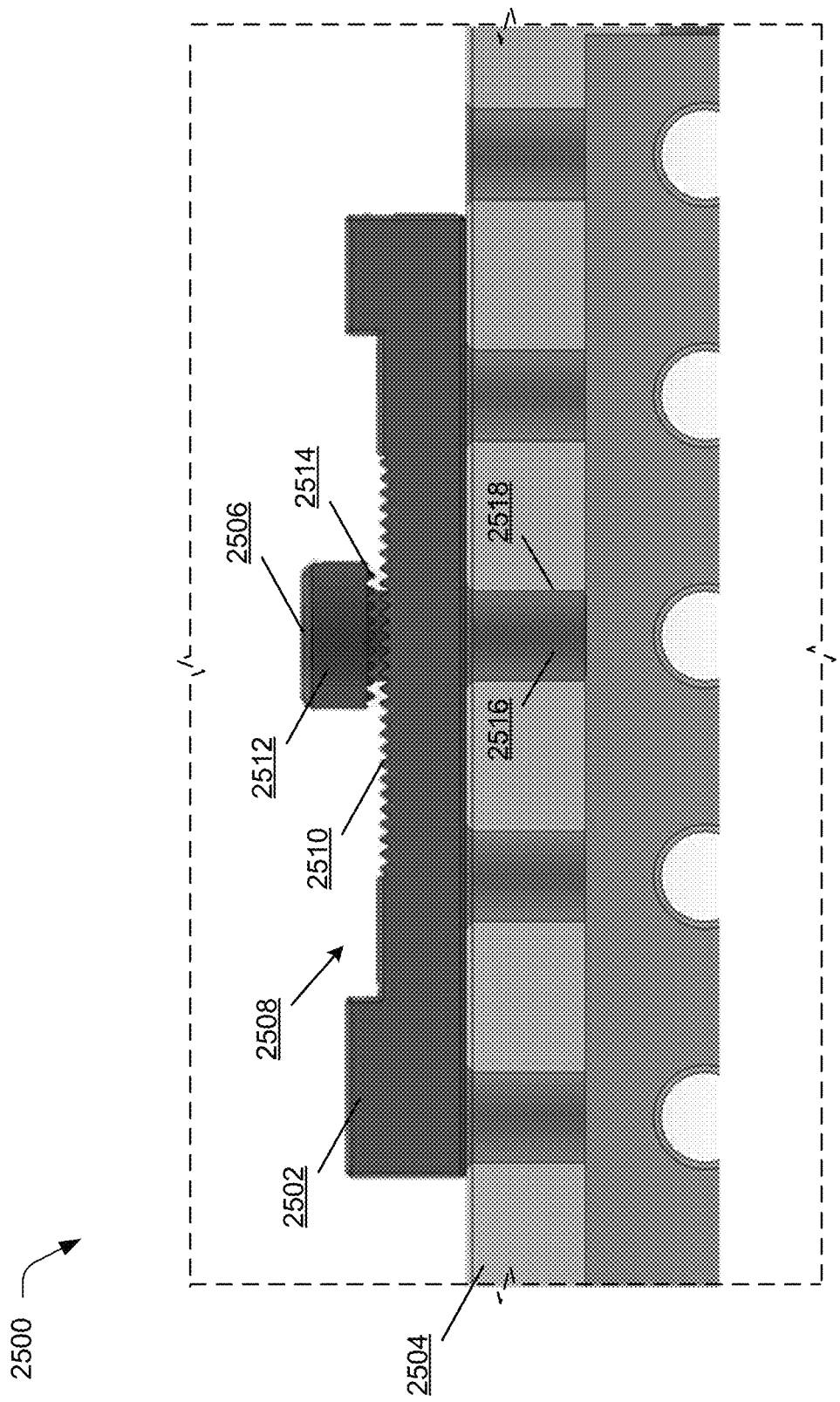
FIG. 25 depicts a scenario for utilizing a toothed member for attachment of a block body to an adjacent surface in accordance with one or more implementations.

FIG. 25 depicts a scenario 2500 for utilizing a toothed member for attachment of a block body to an adjacent surface in accordance with one or more implementations. The scenario 2500 includes a block body 2502 attached to a grid surface 2504 via a tooth pin 2506. In at least one implementation the block body 2502 represents an instance and/or variation of the block bodies discussed throughout this disclosure. The block body 2502, for instance, includes an interior surface 2508 with a body tooth surface 2510. Further, the tooth pin 2506 includes a pin head 2512 with a pin tooth surface 2514 and a pin shaft 2516 that is insertable through an aperture (e.g., a pin slot) in the block body 2502 and a grid aperture 2518 to attach the block body 2502 to the grid surface 2504. As further detailed below, the pin tooth surface 2514 is engageable with the body tooth surface 2510 to prevent movement of the block body 2502 relative to the grid surface 2504.

Figure 26:
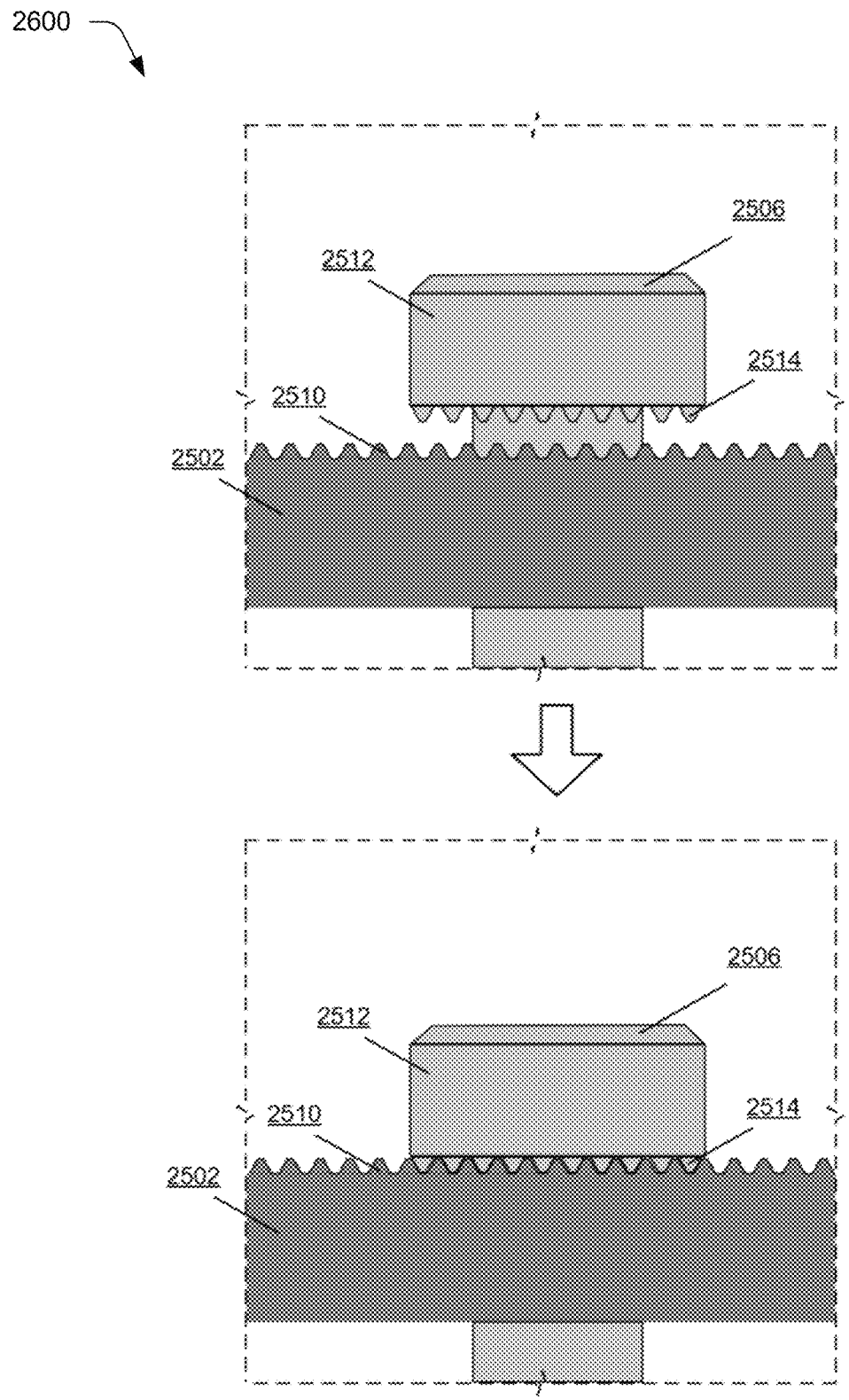
FIG. 26 depicts an implementation scenario for engaging a tooth pin with a block body in accordance with one or more implementations.

FIG. 26 depicts an implementation scenario 2600 for engaging a tooth pin with a block body in accordance with one or more implementations. In the upper portion of the scenario 2600, the tooth pin 2506 is depicted with the pin tooth surface 2514 disengaged from the body tooth surface 2510 of the block body 2502. The tooth pin 2506, for instance, is lifted above the body tooth surface 2510 such that the pin tooth surface 2514 and the body tooth surface 2510 are not engaged, e.g., are not in contact with one another. Proceeding to the lower portion of the scenario 2600 the tooth pin 2506 is engaged with the block body 2502 such that the pin tooth surface 2514 is engaged with the body tooth surface 2510. For instance, with the tooth pin 2506 engaged through the block body 2502 and with an adjacent surface (e.g., a grid surface), engagement of the tooth pin 2506 with the block body 2502 prevents movement of the block body 2502 relative to the adjacent surface. Generally, the pin tooth surface 2514 and the body tooth surface 2510 can be configured based on various tooth surface details discussed throughout this disclosure, such as to include a common tooth pattern and/or differing tooth patterns.

Figure 27:
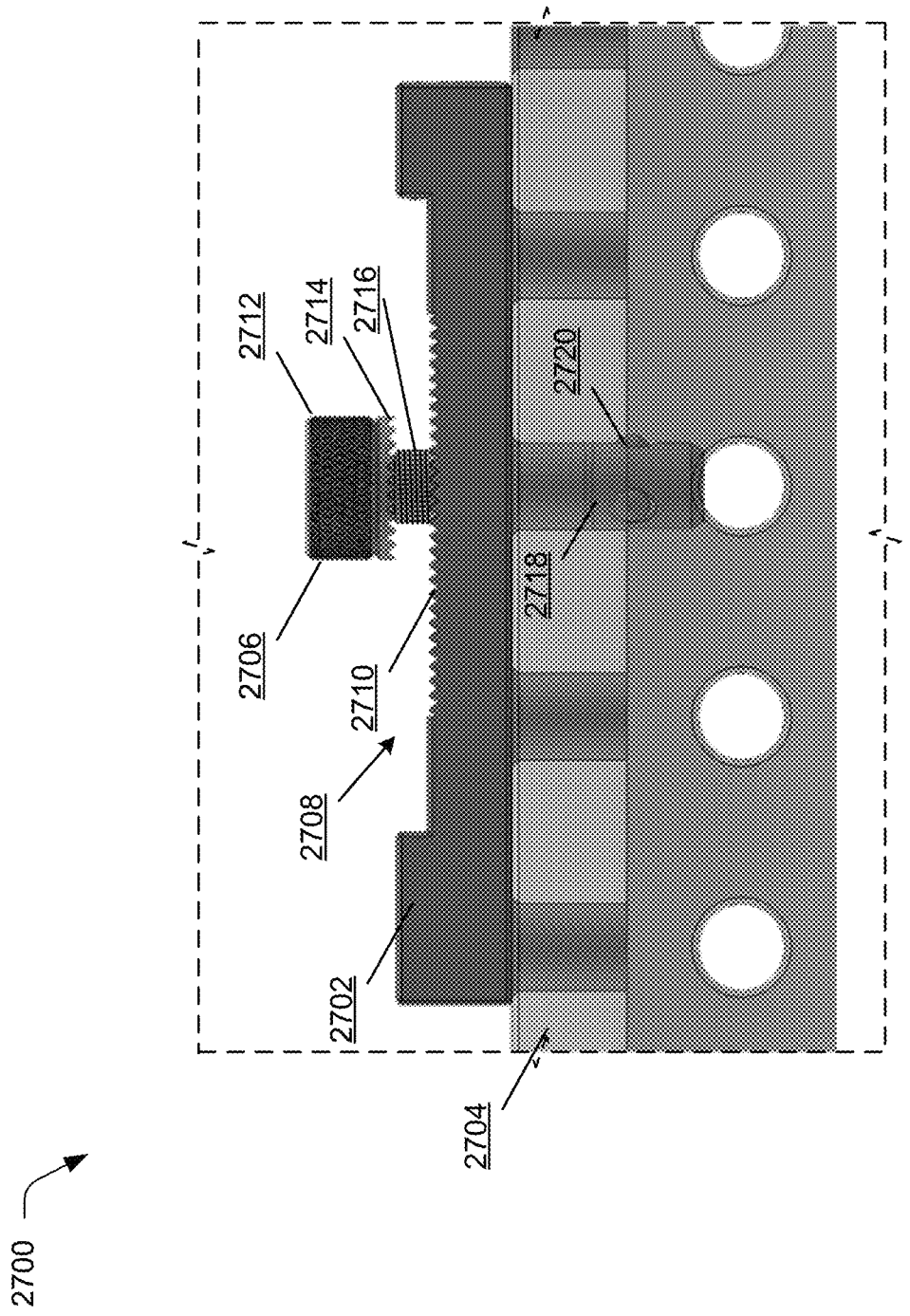
FIG. 27 depicts a scenario for utilizing a locking toothed member for attachment of a block body to an adjacent surface in accordance with one or more implementations.

FIG. 27 depicts a scenario 2700 for utilizing a locking toothed member for attachment of a block body to an adjacent surface in accordance with one or more implementations. The scenario 2700 includes a block body 2702 attached to a grid surface 2704 via a locking pin 2706. In at least one implementation the block body 2702 represents an instance and/or variation of the block bodies discussed throughout this disclosure. The block body 2702, for instance, includes an interior surface 2708 with a body tooth surface 2710. Further, the locking pin 2706 includes a pin head 2712, a tooth plate 2714, an inner pin shaft 2716, and an outer pin shaft 2718. Generally, the tooth plate 2714 can be configured in various ways such as a circular plate (e.g., a washer), a rectangular plate, and/or any other suitable plate with a tooth surface.

Generally, the outer pin shaft 2718 that is insertable through an aperture (e.g., a pin slot) in the block body 2702 and a grid aperture 2720 in the grid surface 2704 to attach the block body 2702 to the grid surface 2704. Further, the inner pin shaft 2716 is positioned internally to the outer pin shaft 2718 and can move within the outer pin shaft 2718. For instance, the inner pin shaft 2716 is threaded and an interior of the outer pin shaft 2718 is tapped to enable threaded engagement of the inner pin shaft 2716 with the interior of the outer pin shaft 2718. For instance, rotating the pin head 2712 causes the inner pin shaft 2716 to move up or down (e.g., depending on direction of rotation) relative to the outer pin shaft 2718. In an example implementation, tightening the pin head 2712 and the inner pin shaft 2716 (e.g., via clockwise rotation) causes the inner pin shaft 2716 to move downward within the outer pin shaft 2718 and causes the tooth plate 2714 to engage with the body tooth surface 2710 to prevent movement of the block body 2702 relative to the grid surface 2704. In at least one implementation the tooth plate 2714 floats on the inner pin shaft 2716 and thus does not rotate with the pin head 2712 and the inner pin shaft 2716. Generally, this enables tightening of the pin head 2712 against the tooth plate 2714 to secure the tooth plate 2714 against the body tooth surface 2710. Further, loosening the pin head 2712 and the inner pin shaft 2716 (e.g., via counterclockwise rotation) causes the inner pin shaft 2716 to move upward within the outer pin shaft 2718 and causes the tooth plate 2714 to disengage from the body tooth surface 2710 to allow movement of the block body 2702 relative to the grid surface 2704. Generally, the tooth plate 2714 and the body tooth surface 2710 can be configured based on various tooth surface details discussed throughout this disclosure, such as to include a common tooth pattern and/or differing tooth patterns.

Figure 28:
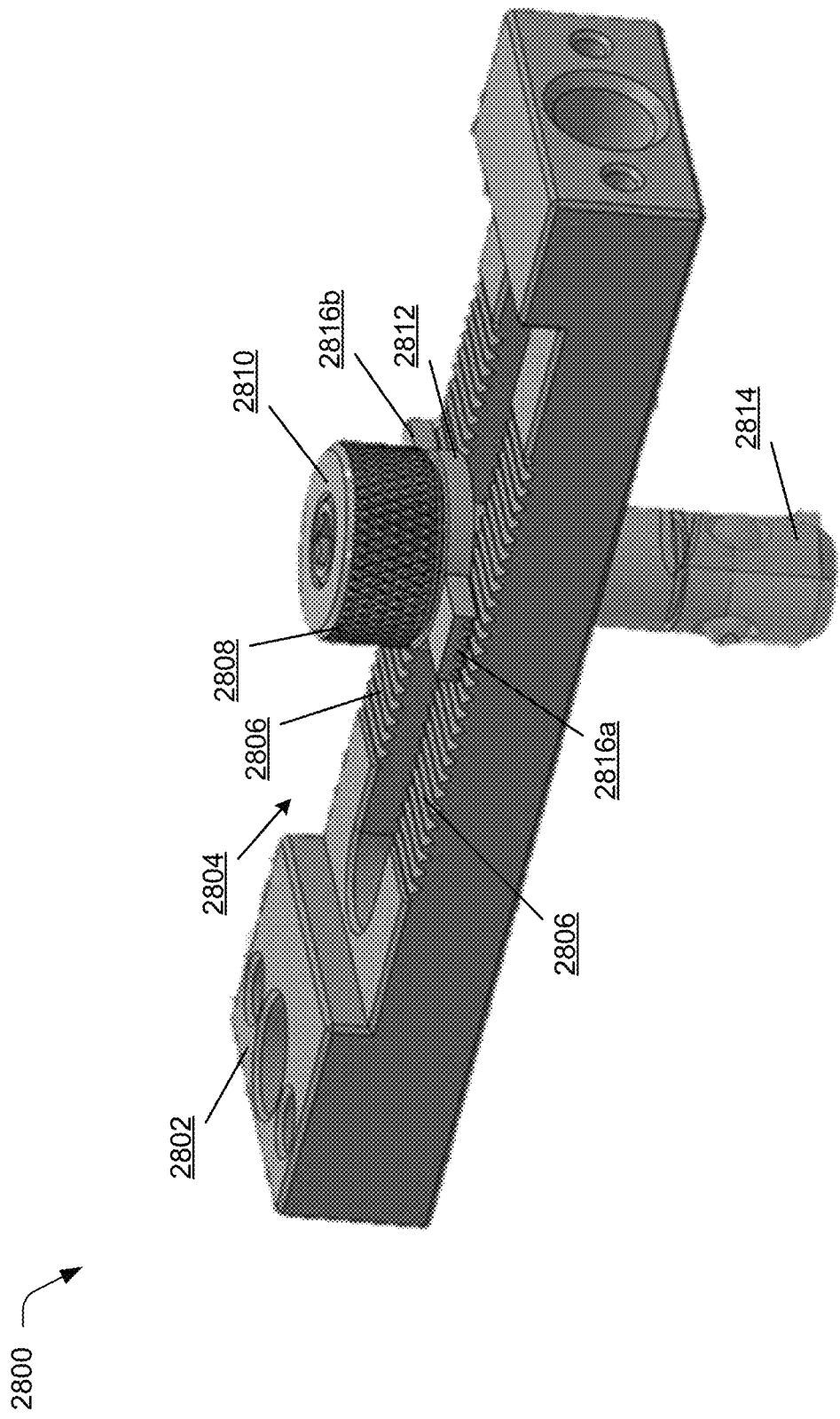
FIG. 28 depicts a scenario for utilizing a locking pin and a pin plate with tooth wings for attachment of a block body to an adjacent surface in accordance with one or more implementations.

FIG. 28 depicts a scenario 2800 for utilizing a locking pin and a pin plate with tooth wings for attachment of a block body to an adjacent surface in accordance with one or more implementations. The scenario 2800 includes a block body 2802 with an interior surface 2804 and a body tooth surface 2806 on the interior surface 2804, and a locking pin 2808 with a pin head 2810, a pin plate 2812, and an outer pin shaft 2814. Further, the pin plate 2812 includes tooth wings 2816a, 2816b. The tooth wings 2816, for instance, extend outwardly from the pin plate 2812 and have toothed surfaces that are engageable with the body tooth surface 2806.

Similarly to the locking pin 2706 detailed above, the locking pin 2808 includes an inner pin shaft (not depicted here) that is movable within the outer pin shaft 2814. For instance, rotating the pin head 2810 causes the inner pin shaft to move up or down (e.g., depending on direction of rotation) relative to the outer pin shaft 2814. In an example implementation, with the locking pin 2808 engaged with an adjacent surface (e.g., a grid surface), tightening the pin head 2810 and the inner pin shaft (e.g., via clockwise rotation) causes the inner pin shaft to move downward within the outer pin shaft 2814 and causes downward movement of the pin plate 2812. Further downward movement of pin plate 2812 causes the tooth wings 2816 to engage with the body tooth surface 2806 to prevent movement of the block body 2802 relative to an adjacent surface. In at least one implementation the pin plate 2812 floats on the inner pin shaft and thus does not rotate with the pin head 2810 and the inner pin shaft. Generally, this enables tightening of the pin head 2810 against the pin plate 2812 to secure the tooth wings 2816 against the body tooth surface 2806. Further, loosening the pin head 2810 and the inner pin shaft (e.g., via counterclockwise rotation) causes the inner pin shaft to move upward within the outer pin shaft 2814 and enables the pin plate 2812 and thus the tooth wings 2816 to disengage from the body tooth surface 2806 to allow movement of the block body 2802 relative to an adjacent surface. Generally, the tooth wings 2816 and the body tooth surface 2806 can be configured based on various tooth surface details discussed throughout this disclosure, such as to include a common tooth pattern and/or differing tooth patterns.

Figure 29:
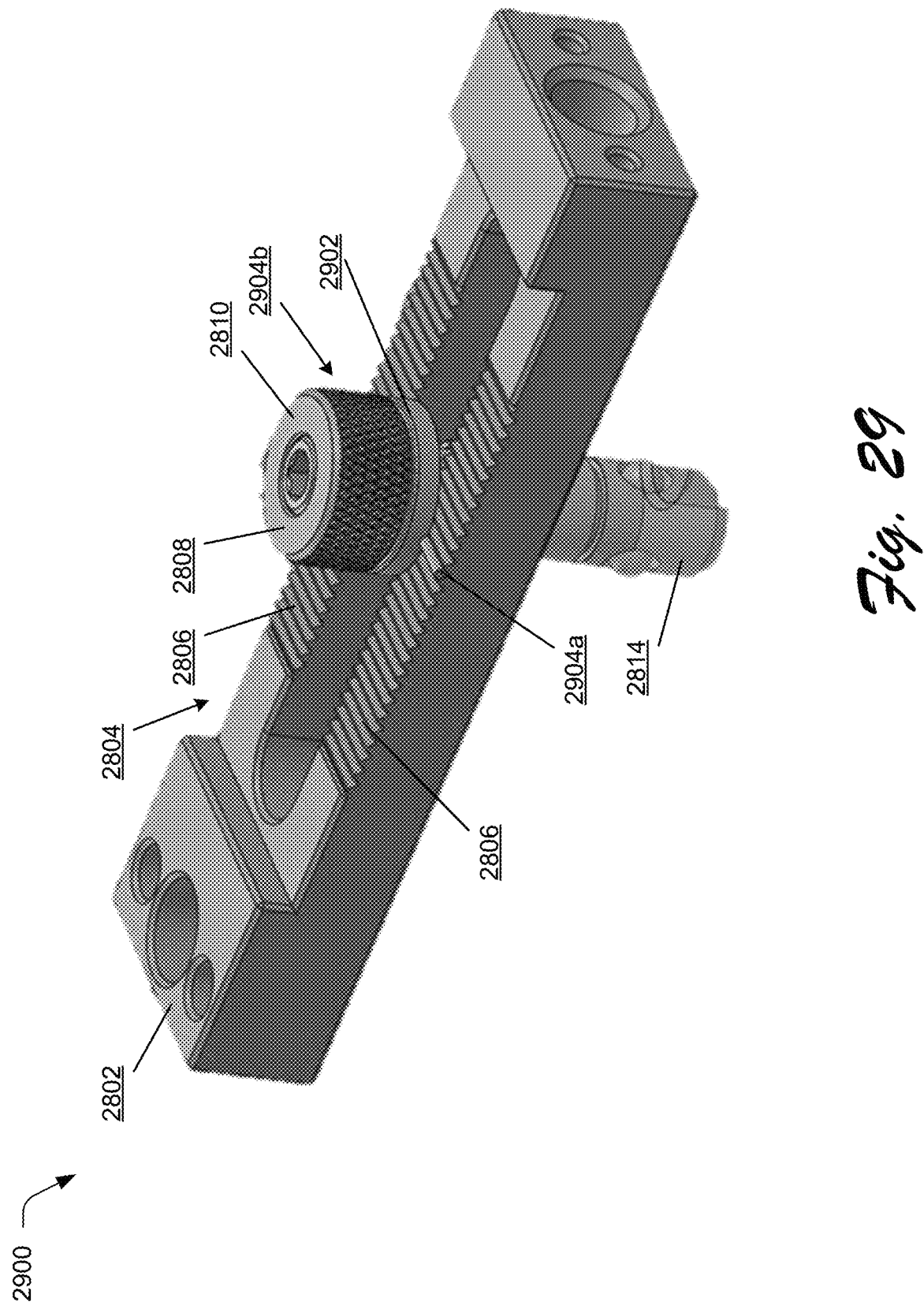
FIG. 29 depicts a scenario for utilizing a locking pin and a pin plate with engagement members for attachment of a block body to an adjacent surface in accordance with one or more implementations.

FIG. 29 depicts a scenario 2900 for utilizing a locking pin and a pin plate with engagement members for attachment of a block body to an adjacent surface in accordance with one or more implementations. The scenario 2900 includes the block body 2802 with the interior surface 2804 and the body tooth surface 2806 on the interior surface 2804, and the locking pin 2808 with the pin head 2810, a pin plate 2902, and the outer pin shaft 2814. Further, the pin plate 2902 includes engagement pins 2904a, 2904b, with engagement pin 2904b not being visible in this view. The engagement pins 2904, for instance, extend outwardly from the pin plate 2902 and are dimensioned to engage within valleys between teeth in the body tooth surface 2806.

Generally, engagement and disengagement of the pin plate 2902 operates similarly to that described above with reference to the scenarios 2700, 2800 detailed above. For instance, tightening the pin head 2810 causes the pin plate 2902 to move downward and the engagement pins 2904 to engage with valleys in the tooth surface 2806. Further, loosening the pin head releases pressure from the pin plate 2902 such that the engagement pins 2904 can disengage from the tooth surface 2806. In at least one implementation the pin plate 2902 floats on the inner pin shaft of the locking pin 2808 and thus does not rotate with the pin head 2810 and the inner pin shaft. Generally, this enables tightening of the pin head 2810 against the pin plate 2902 to engage the engagement pins 2904 with the body tooth surface 2806.

Figure 30:
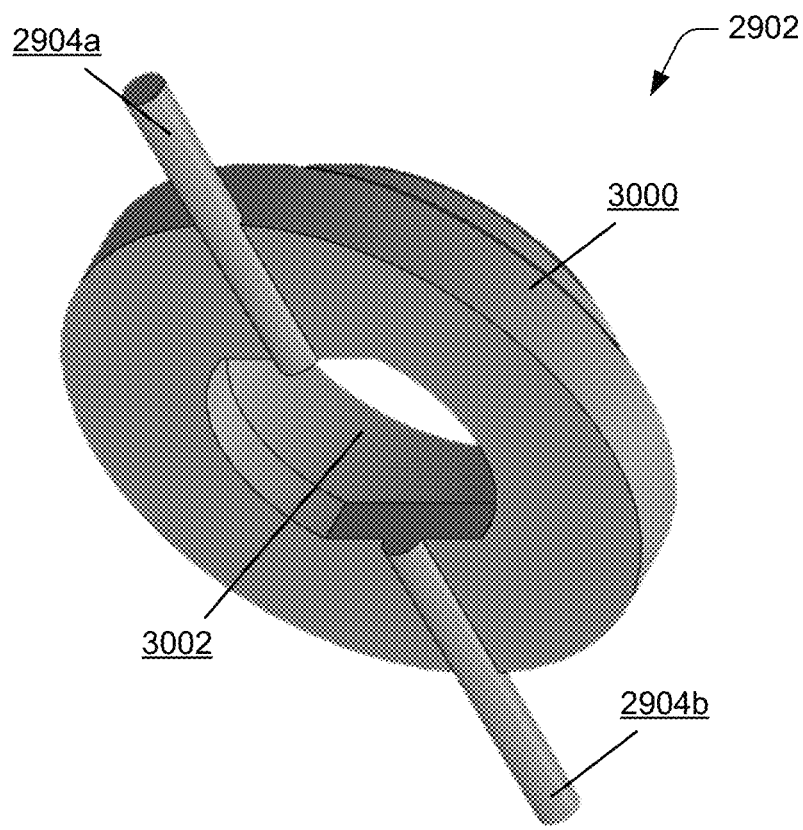
FIG. 30 depicts a detailed example of a pin plate in accordance with one or more implementations.

FIG. 30 depicts the pin plate 2902 introduced above in more detail in accordance with one or more implementations. The pin plate 2902 includes a washer body 3000, a washer aperture 3002 formed within the washer body 3000, and the engagement pins 2904a, 2904b. Generally, a pin shaft such as an inner pin shaft discussed above can be inserted through the washer aperture 3002. While the engagement pins 2904 are cylindrical in this" particular implementation, the engagement pins 2904 can be implemented in a variety of different forms that are engageable with a tooth surface, such as triangular engagement pins that fit within valleys of a tooth surface. Further, the engagement pins 2904 can be formed in various ways, such as integrated features of the pin plate 2902, features that are attached to the pin plate 2902, and so forth.

Generally, the various structures discussed herein such as block bodies and toothed surfaces and features are combinable in various ways including implementations not expressly illustrated herein to provide for a variety of different positionable block assemblies.

Conclusion

Accordingly, positionable block assemblies and techniques are described. The positionable block assemblies are usable to ensure precise and durable alignment of various workpieces while providing access for performing attachment and/or other work techniques thereon, which is not possible using conventional tools and techniques.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention. Additional aspects of the techniques, features, and/or methods discussed herein relate to one or more of the following:

A block assembly including: a block body including a top surface, one or more bottom surfaces, an interior surface formed within the one or more bottom surfaces, and a pin slot formed at least partially along the top surface and extending through an interior of the block body to the interior surface, the interior surface including a body tooth surface with an arrangement of teeth that extend downwardly toward the one or more bottom surfaces; and a plate member including a top surface, a bottom surface, one or more apertures that extend from the top surface through the plate member to the bottom surface, the top surface of the plate member including a plate tooth surface with an arrangement of teeth that extend upwardly relative to the top surface, wherein the plate member is dimensioned to fit at least partially within the interior surface of the block body such that the plate tooth surface at least partially engages with the body tooth surface and the plate member is positionable at multiple different positions along a longitudinal length of the interior surface of the block body.

In addition to the previously described block assembly, any one or more of the following: wherein the one or more apertures of the plate member include one or more circular apertures that align with the pin slot of the block body with the plate tooth surface at least partially engaged with the body tooth surface; wherein the one or more apertures of the plate member include an elongated oval aperture that aligns with the pin slot of the block body with the plate tooth surface at least partially engaged with the body tooth surface; wherein the arrangement of teeth of the body tooth surface includes valleys between teeth, and wherein the block body includes a scale region with scale marks that are positioned to coincide with one of more of: at least some of the valleys or at least some of the teeth; wherein the scale marks are arranged according to a defined increment of a linear measurement scale, the block assembly includes a front surface and a rear surface, and wherein one or more of the front surface or the rear surface is formed at a distance from the measurement scale of a specified multiple of the defined increment; wherein the plate member is so dimensioned such that with the plate tooth surface at least partially engaged with the body tooth surface, the bottom surface of the plate member is substantially coplanar with the one or more bottom surfaces of the block body; wherein the block body includes a front surface and a rear surface, and wherein the front surface includes face surface and one or more angled surfaces that are angled at an acute angle relative to the face surface; wherein the arrangement of teeth of the body tooth surface includes a different tooth pattern than the arrangement of teeth of the plate tooth surface; wherein the different tooth pattern of the body tooth surface includes one or more of a coarser tooth pattern or a finer tooth pattern than the arrangement of teeth of the plate tooth surface; wherein the block body further includes one or more apertures formed within the top surface adjacent the pin slot and configured to receive engagement of one or more circular pieces.

A block body including: a top surface, a bottom surface, an interior surface formed within the bottom surface; a pin slot formed at least partially along the top surface and extending through the block body to the interior surface, the interior surface forming an interior cavity relative to the bottom surface; and one or more fitting cavities formed within the interior cavity and extending longitudinally along one or more side surfaces of the block body.

In addition to the previously described block body, any one or more of the following: wherein the pin slot includes an extended oval slot extending longitudinally along the block body, and wherein the one or more fitting cavities extend longitudinally and codirectionally with the pin slot; further including one or more tooth fittings attached within the one or more fitting cavities, the one or more tooth fittings including one or more tooth surfaces with teeth that extend beyond the interior surface toward a bottom surface of the block body; wherein the teeth extend beyond the interior surface and the one or more tooth fittings are coplanar with the one or more side surfaces of the block body; further including a front surface and a rear surface, and wherein the front surface includes face surface and one or more angled surfaces that are angled at an acute angle relative to the face surface.

A block assembly including: a block body including: a top surface, one or more bottom surfaces, and an interior surface formed within the one or more bottom surfaces; a pin slot formed at least partially along the top surface and extending through the block body to the interior surface; an arrangement of teeth positioned longitudinally relative to the interior surface and that extend downwardly toward the one or more bottom surfaces; and an engagement body including one or more engagement members that are dimensioned to be engageable with the arrangement of teeth in the block body, wherein the engagement body is moveable to different positions relative to the block body via engagement of the one or more engagement members with different respective portions of the arrangement of teeth of the block body.

In addition to the previously described block assembly, any one or more of the following: wherein the interior surface of the block body further includes one or more fitting cavities that extend longitudinally along the block body, and wherein arrangement of teeth is positioned on one or more tooth fittings fastened within the one or more fitting cavities; wherein the block body includes a first side surface and a second side surface, one or more tooth fittings attached to one or more of the first side surface or the second side surface, the one or more tooth fittings including the arrangement of teeth; wherein the engagement body includes a pin and the one or more engagement members include a toothed portion of the pin that is engageable with the arrangement of teeth of the block body; wherein the engagement body includes a plate with the one or more engagement members extending from the plate. Generally, an engagement body as described can include pieces such as plate members, pins, washer, and so forth, that are engageable with a block body. Further, an engagement member can include features of an engagement body such as tooth surfaces, pins, tooth wings, and so forth, that are engageable with a tooth surface of a block body.

What is claimed is:

1. A block assembly comprising:
a block body including a top surface, one or more bottom surfaces, an interior surface formed within the one or more bottom surfaces, and a pin slot formed at least partially along the top surface and extending through an interior of the block body to the interior surface, the interior surface including a body tooth surface with an arrangement of teeth that extend downwardly toward the one or more bottom surfaces, the block body further including a front surface and a rear surface, the front surface including a face surface and one or more angled surfaces that are angled at an acute angle relative to the face surface; and a plate member including a top surface, a bottom surface, one or more apertures that extend from the top surface through the plate member to the bottom surface, the top surface of the plate member including a plate tooth surface with an arrangement of teeth that extend upwardly relative to the top surface, wherein the plate member is dimensioned to fit at least partially within the interior surface of the block body such that the plate tooth surface at least partially engages with the body tooth surface and the plate member is positionable at multiple different positions along a longitudinal length of the interior surface of the block body.

2. The block assembly as described in claim 1, wherein the one or more apertures of the plate member comprise one or more circular apertures that align with the pin slot of the block body with the plate tooth surface at least partially engaged with the body tooth surface.

3. The block assembly as described in claim 1, wherein the one or more apertures of the plate member comprise an elongated oval aperture that aligns with the pin slot of the block body with the plate tooth surface at least partially engaged with the body tooth surface.

4. The block assembly as described in claim 1, wherein the arrangement of teeth of the body tooth surface includes valleys between teeth, and wherein the block body comprises a scale region with scale marks that are positioned to coincide with one of more of: at least some of the valleys or at least some of the teeth.

5. The block assembly as described in claim 4, wherein the scale marks are arranged according to a defined increment of a linear measurement scale, the block assembly includes a front surface and a rear surface, and wherein one or more of the front surface or the rear surface is formed at a distance from the measurement scale of a specified multiple of the defined increment.

6. The block assembly as described in claim 1, wherein the plate member is so dimensioned such that with the plate tooth surface at least partially engaged with the body tooth surface, the bottom surface of the plate member is substantially coplanar with the one or more bottom surfaces of the block body.

7. The block assembly as described in claim 1, wherein the arrangement of teeth of the body tooth surface comprises a different tooth pattern than the arrangement of teeth of the plate tooth surface.

8. The block assembly as described in claim 7, wherein the different tooth pattern of the body tooth surface comprises one or more of a coarser tooth pattern or a finer tooth pattern than the arrangement of teeth of the plate tooth surface.

9. The block assembly as described in claim 1, wherein the block body further comprises one or more apertures formed within the top surface adjacent the pin slot and configured to receive engagement of one or more circular pieces.

10. A block body comprising:
a top surface, a bottom surface, an interior surface formed within the bottom surface;
a pin slot formed at least partially along the top surface and extending through the block body to the interior surface, the interior surface forming an interior cavity relative to the bottom surface;

one or more fitting cavities formed within the interior cavity and extending longitudinally along one or more side surfaces of the block body; and
a front surface and a rear surface, the front surface including a face surface and one or more angled surfaces that are angled at an acute angle relative to the face surface.

11. The block body as described in claim 10, wherein the pin slot comprises an extended oval slot extending longitudinally along the block body, and wherein the one or more fitting cavities extend longitudinally and codirectionally with the pin slot.

12. The block body as described in claim 10, further comprising one or more tooth fittings attached within the one or more fitting cavities, the one or more tooth fittings including one or more tooth surfaces with teeth that extend beyond the interior surface toward a bottom surface of the block body.

13. The block body as described in claim 12, wherein the teeth extend beyond the interior surface and the one or more tooth fittings are coplanar with the one or more side surfaces of the block body.

14. A block assembly comprising:
a block body including:
a top surface, one or more bottom surfaces, and an interior surface formed within the one or more bottom surfaces;
a pin slot formed at least partially along the top surface and extending through the block body to the interior surface; and
an arrangement of teeth positioned longitudinally relative to the interior surface and that extend downwardly toward the one or more bottom surfaces; and
an engagement body including one or more engagement members that are dimensioned to be engageable with the arrangement of teeth in the block body, wherein the engagement body is moveable to different positions relative to the block body via engagement of the one or more engagement members with different respective portions of the arrangement of teeth of the block body, the engagement body comprising at least one of:
a first pin and the one or more engagement members comprise a toothed portion adjacent a head of the first pin that is engageable with the arrangement of teeth of the block bod; or
a second pin and a plate that is positionable against a head of the second pin, the plate including one or more engagement members that are engageable with the arrangement of teeth of the block body.

15. The block assembly as described in claim 14, wherein the interior surface of the block body further comprises one or more fitting cavities that extend longitudinally along the block body, and wherein arrangement of teeth is positioned on one or more tooth fittings fastened within the one or more fitting cavities.

16. The block assembly as described in claim 14, wherein the block body comprises a first side surface and a second side surface, one or more tooth fittings attached to one or more of the first side surface or the second side surface, the one or more tooth fittings including the arrangement of teeth.

17. The block assembly as described in claim 14, wherein the toothed portion adjacent the head of the first pin is formed as part of the head of the first pin.

18. The block assembly as described in claim 14, wherein the toothed portion adjacent the head of the first pin comprises a tooth plate adjacent the head of the first pin.

19. The block assembly as described in claim 14, wherein the one or more engagement members comprise one or more tooth wings that extend outwardly from the plate.

20. The block assembly as described in claim 14, wherein the one or more engagement members comprise one or more engagement pins that extend outwardly from the plate.

* * * * *